(12) United States Patent
Roddy et al.

(10) Patent No.: US 6,930,759 B2
(45) Date of Patent: Aug. 16, 2005

(54) METHOD AND APPARATUS FOR EXPOSING A LATENT WATERMARK ON FILM

(75) Inventors: James E. Roddy, Rochester, NY (US); Robert J. Zolla, Rochester, NY (US); Louis S. Horvath, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 10/669,069

(22) Filed: Sep. 23, 2003

(65) Prior Publication Data

US 2005/0063742 A1 Mar. 24, 2005

(51) Int. Cl.⁷ .................................................. G03B 27/54
(52) U.S. Cl. ............................. 355/67; 347/255; 352/92
(58) Field of Search ........................... 347/239, 244, 347/255, 256; 382/100, 284; 355/32, 67, 71; 352/39, 44, 56, 85, 92, 130

(56) References Cited

U.S. PATENT DOCUMENTS

| | | | |
|---|---|---|---|
| 5,315,098 A | 5/1994 | Tow | |
| 5,457,540 A | 10/1995 | Kajita | |
| 5,517,340 A * | 5/1996 | Doany et al. | ................... 349/5 |
| 5,557,416 A | 9/1996 | Sasanuma et al. | |
| 5,734,752 A | 3/1998 | Knox | |
| 5,752,152 A | 5/1998 | Gasper et al. | |
| 5,864,742 A | 1/1999 | Gasper et al. | |
| 6,166,750 A | 12/2000 | Negishi | |
| 6,215,547 B1 * | 4/2001 | Ramanujan et al. | .......... 355/67 |
| 6,256,110 B1 | 7/2001 | Yoshitani | |
| 6,370,258 B1 | 4/2002 | Uchida | |
| 6,407,767 B1 | 6/2002 | Klees et al. | |
| 6,430,302 B2 * | 8/2002 | Rhoads | ....................... 382/100 |
| 2003/0012569 A1 | 1/2003 | Lowe et al. | |

* cited by examiner

Primary Examiner—David M. Gray
(74) Attorney, Agent, or Firm—Nelson Adrian Blish

(57) ABSTRACT

A printing method and apparatus (100) for pre-exposing a digital watermark along a length of photosensitive medium at the time of manufacture is disclosed. The printing apparatus has an illumination source (60) for providing an exposure illumination, first and second LCD spatial light modulators (90a, 90b) for modulating the exposure illumination to form first and second exposure patterns according to image data, combining optics providing a single output path for directing both first and second exposure patterns onto the photosensitive medium and transport means for providing, during exposure, lengthwise displacement of the photosensitive medium with respect to the output path. The first and second exposure patterns form, lengthwise along the photosensitive medium, a latent image with modulated stripes having a predetermined intensity corresponding to the exposure patterns.

42 Claims, 19 Drawing Sheets

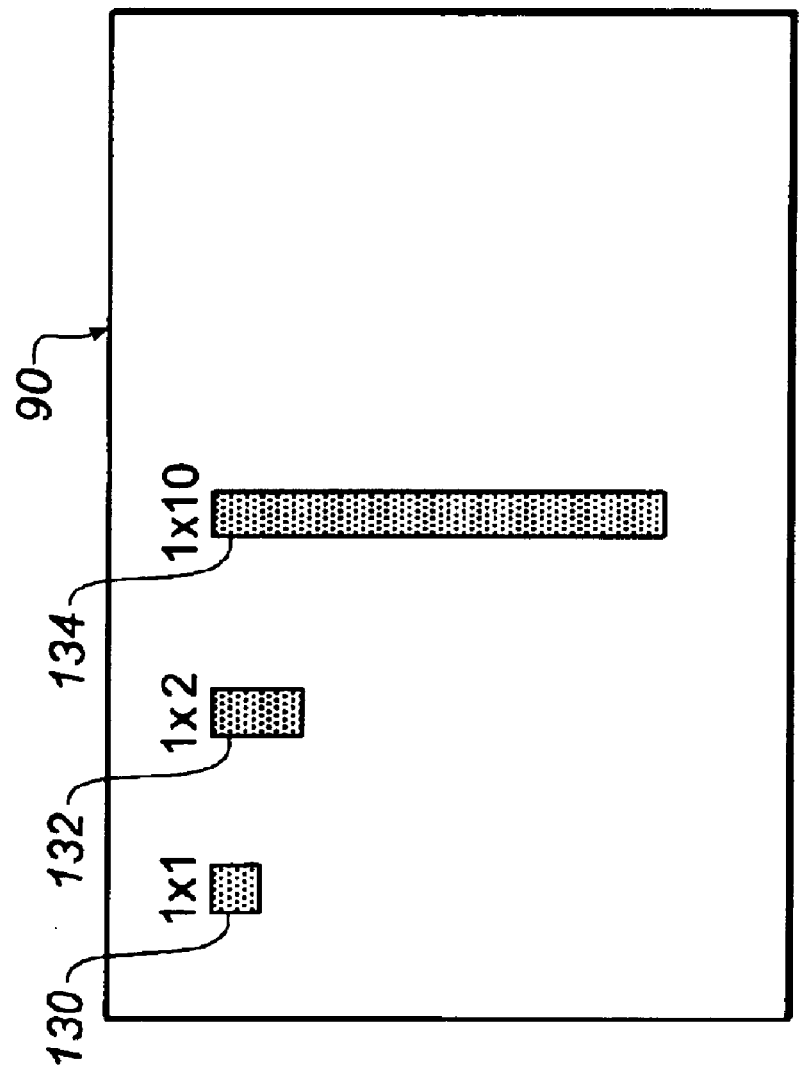

METHOD AND APPARATUS FOR EXPOSING A LATENT WATERMARK ON FILM

CROSS REFERENCE TO RELATED APPLICATIONS

Reference is made to commonly-assigned copending U.S. patent application Ser. No. 10/342,009, filed Jan. 14, 2003, entitled IMPROVED LIGHT SOURCE USING LARGE AREA LEDs, by Oehlbeck et al., and U.S. patent application Ser. No. 10/364,488, filed Feb. 11, 2003, entitled METHOD AND APPARATUS FOR WATERMARKING FILM, by Roddy et al., the disclosures of which are incorporated herein.

FIELD OF THE INVENTION

This invention relates to providing a watermark on an imaging film medium in general, and in particular relates to forming a watermark onto photosensitive film that is manufactured at high speeds, such as motion picture film.

BACKGROUND OF THE INVENTION

An encoded watermark is one type of forensic aid that has been proposed for identifying the source of an illegal copy of a motion picture. When provided with a suitable watermark, a projected motion picture image carries within itself identifying data that persists after any type of copying operation, whether an unauthorized copy was made in the theater using a portable digital camera or duplicated from illegally obtained film prints.

A watermark scheme for motion picture images must meet the same base set of requirements that apply to watermark approaches for protection of still images and many other types of documents. Key requirements for effective motion picture watermark implementation include the following:

(a) Not detectable to the viewer. A visible watermark would be annoying and would detract from image quality and from the overall film viewing experience.

(b) Robust. At the same time, the watermark must be durable so that it can be identified with suitable detection techniques and cannot be easily filtered out. Ideally, some tolerance should be allowed for shifting of the watermark within an image frame, to allow straightforward detection with conventional scanning equipment.

(c) Workable with existing emulsion formulations. For ease of acceptance and implementation, a motion picture watermarking scheme should not require changes to emulsion formulations or processing treatments currently in use. This would allow a watermark application to be introduced in a phased manner, over a period of time or with selected films, without disruption of film manufacture or processing operations.

Also of interest would be a watermark implementation that provides the following advantages:

(d) Speed. Driven by economic factors and high volumes, film fabrication and subsequent processing are performed at high speeds. There would be considerable reluctance among film manufacturers or processors to adapting a watermarking method that slowed motion film production or processing.

(e) Ease of integration. In order to make watermarking feasible, any method that is adopted must allow for ease of implementation within existing film production and processing workflows. Pre-exposure of a photosensitive film medium would allow watermark application at the source of manufacture of distributed print films, allowing film distributors the option to use or to ignore watermarking.

Added to these requirements are overall concerns for minimizing cost and maintaining overall quality of the projected image.

A number of approaches for image watermarking have been proposed in the art. For example:

U.S. Pat. No. 5,734,752 (Knox) discloses a method for digital image watermarking of a document using a randomized, stochastic screen pattern;

U.S. Pat. No. 5,315,098 (Tow) discloses the use of glyphs, small lines of a few pixels length, within an image, the glyphs oriented at various angles to store watermarking data; Commonly-assigned U.S. Pat. Nos. 5,752,152 and 5,864,742 (Gasper et al.) disclose the use of pre-exposed microdots distributed on a photosensitive imaging medium used for images that are copyright-protected;

U.S. Pat. No. 6,166,750 (Negishi) discloses a watermarking scheme by adding pixel data to a copied image;

U.S. Pat. No. 6,370,258 (Uchida) discloses a number of watermarking approaches, such as varying pixel dot position, modulating density of a color component, or adding high-frequency image data;

U.S. Pat. Nos. 5,457,540 (Kajita) and U.S. Pat. No. 5,557,416 (Sasanuma et al.) both disclose watermark formation by changing dot density of an applied color in an image;

U.S. Pat. No. 6,256,110 (Yoshitani) discloses using a plurality of inks of nearly the same color for encoding data in an image;

U.S. patent application Ser. No. US 2003/0012569 (Lowe et al.) discloses a method for pre-exposing a photosensitive imaging medium to apply a watermarking (steganographic) pattern, using a custom-designed, movable barrel-shaped imaging member that is rolled along the surface of the unexposed film or using illumination gated by a narrow slit; and U.S. Pat. No. 6,407,767 (Klees et al.) discloses an apparatus for exposing sensitometric (calibration) patches and barcode data onto color negative film during the manufacturing process. Two white light flashlamps, one large and one small, are used to expose gray scale patches onto the processed film. While the disclosed apparatus can provide accurate color-neutral exposure onto stationary film as part of a manufacturing test process, its power is not sufficient for exposing film that is traveling at speeds in excess of a few feet/second. Moreover, resolution provided by this technique is not sufficient for minimizing the visible effects of the embedded data.

These and similar approaches have been applied, with varying degrees of success, to the watermarking of documents and still images. However, none of the approaches outlined in these disclosures is well suited for motion picture film watermarking, in light of the requirements listed in (a) through (e) above. Methods that apply added color to an image could be used, in the spirit of the above-noted U.S. Pat. Nos. 5,457,540; 6,166,750; and 5,557,416; however, this operation must be provided by the motion picture film printing lab and distributor. As is noted above, changes to the existing, high-volume workflow are not likely to gain acceptance. High-cost printing apparatus, such as would be needed using the approach of the above-noted U.S. patent application Ser. No. 2003/0012569, would not be desirable, nor would color or emulsion formulation changes, such as might be suggested in the approach of U.S. Pat. No. 6,256,110 noted above. Methods that form a two-dimensional watermark, such as those disclosed in the above-noted U.S. Pat. Nos. 5,752,152; 5,864,742; 5,734,752; 6,370,258; and 5,315,098, would require pre-exposure of an area of the film. With film moving through fabrication stages at high speeds, extremely high intensity and very short exposure times are required. Reciprocity failure problems in film exposure, heightened by these requirements, further complicate the problem of applying a two-dimensional watermark.

Thus, it can be seen that the prior art solutions noted above are not well suited to the requirement for pre-exposure of a watermark following high-speed film coating and drying and preceding high-volume packaging operations. Further, considering the needed response and refresh times, most types of image-forming devices simply operate too slowly for high-speed watermarking applications. There is, therefore, a need for an apparatus and method for watermark pre-exposure onto a photosensitive film medium during its manufacture that meets demanding requirements for high-speed and low cost.

SUMMARY OF THE INVENTION

An object of the present invention is to provide an apparatus and method for providing a spatially sparse watermark onto a newly manufactured photosensitive film medium such as motion picture film. Briefly, according to one aspect of the present invention, an apparatus for exposing a latent watermark along a length of photosensitive medium comprises:

(a) an illumination source for providing an exposure illumination;

(b) a first spatial light modulator for modulating the exposure illumination to form a first exposure pattern according to image data;

(c) a second spatial light modulator for modulating the exposure illumination to form a second exposure pattern according to image data;

(d) combining optics providing a single output path for directing the first and second exposure patterns onto the photosensitive medium;

(e) transport means for providing lengthwise displacement of the photosensitive medium with respect to the single output path;

wherein the first and second spatial light modulators cyclically alternate in providing their respective first and second exposure patterns to the combining optics, such that during a cycle wherein the first spatial light modulator forms the first exposure pattern, the second spatial light modulator loads the image data for providing the second exposure pattern; and the first and second exposure patterns thereby forming, lengthwise along the photosensitive medium, a latent image comprising modulated stripes having a predetermined intensity.

It is a feature of the present invention that, when used in a high-speed film finishing operation, it encodes a latent pattern of lengthwise marks onto one or more sensitized layers of a photosensitive medium. When the photosensitive medium is subsequently developed, the lengthwise marks thus formed can be essentially imperceptible to a viewing audience.

It is an advantage of the present invention that the apparatus and method can be used to affect only a single color plane of the motion picture film or other photosensitive medium, minimizing perceptible impact on the image exposed when filming and simplifying design complexity and cost for illumination sources and combining optics.

It is a further advantage of the present invention that it provides sufficient speed for use during high-volume film manufacture while avoiding the time exposure region associated with reciprocity failure.

It is a further advantage of the present invention that it provides a robust watermarking method without requiring changes to emulsion formulations for photosensitive media. The apparatus and method of the present invention allow watermarking to be added at a suitable point during film fabrication, without the need to alter existing timing or sequencing operations.

It is a further advantage of the present invention that it allows broad tolerances for alignment differences between the first and second spatial light modulators.

It is a further advantage of the present invention that it requires only a minimum data bandwidth for forming a watermark.

It is yet a further advantage of the present invention that it utilizes high-speed film movement during manufacturing stages in order to provide a two-dimensional watermarking image.

It is yet a further advantage of the present invention that it allows the use of low-cost spatial light modulators for exposing a watermark onto photosensitive media during manufacture, surmounting inherent problems of response time and refresh rate that would otherwise prevent use of these spatial light modulators for this purpose.

It is yet a further advantage of the present invention that it provides a marking scheme that is positionally independent from any specific perforation processing for motion picture film. There is no need for alignment of the watermark of the present invention with individual image frames.

It is yet a further advantage of the present invention that it does not require maintaining strict tolerance for watermark positioning relative to image pixels. Instead, the marking scheme of the present invention can be largely independent of specific pixel position.

It is yet a further advantage of the present invention that it allows a watermark to be formed using liquid crystal spatial light modulators, devices that have the advantage of low cost but would otherwise present the disadvantage of slow response time.

It is yet a further advantage of the present invention that it does not require expensive, high resolution encoder mechanisms for positional tracking of watermark placement during fabrication of the photosensitive medium.

It is yet a further advantage of the present invention that it provides a watermark that is relatively imperceptible to the viewer, even where a viewer is aware that a watermarking scheme is being implemented.

BRIEF DESCRIPTION OF THE DRAWINGS

FIG. 10a shows 3 point locations on a moving piece of film and an exposing swath of uniform light, just as the light is turned on;

FIG. 12 shows image patterns on a spatial light modulator with aspect ratios of 1:1, 2:1, and 10:1 respectively;

DETAILED DESCRIPTION OF THE INVENTION

The present invention is directed in particular to elements forming part of, or in cooperation more directly with an apparatus in accordance with the present invention. It is to be understood that elements not specifically shown or described may take various forms well known to those skilled in the art.

Figure 1:
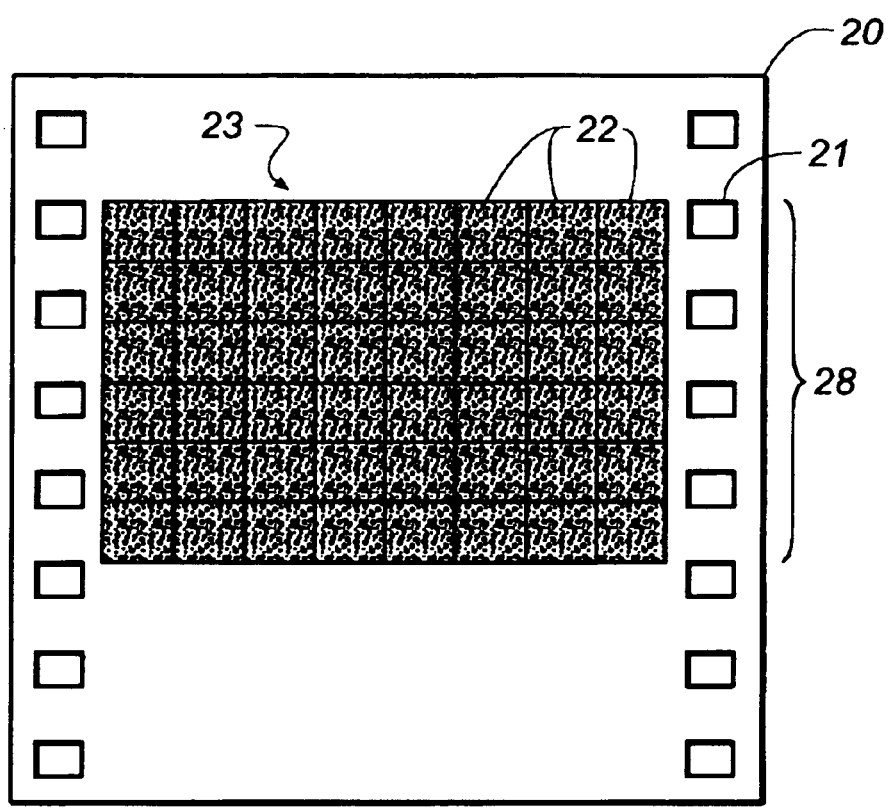
FIG. 1 is a schematic diagram of a full frame of a tiled, full coverage watermark, consisting of eight tiles across six tiles in a length direction.

Referring to FIG. 1, there is shown a conventional area coverage watermark 23 within an image frame 28. A film 20 has perforations (perfs) 21, where a typical image frame, including the interframe gap, covers four perfs. Area watermark 23 consists of an 8×6 array of identical tiles 22, each tile 22 is repeated multiple times within image frame 28. An array of tiles 22 covers the full aperture of image frame 28 and also covers any gap between image frames 28. Entire area watermark 23 of 8×6 tiles 22 may be exposed simultaneously or may be formed by exposing a single row of tiles 22 at a time. Using such a method, after exposure of a row of tiles 22, film 20 is transported the length of one watermark 23. At this point, another flash exposure occurs to form a second row of tiles 22 contiguous with the first, to within a pixel or a fraction of a pixel tolerance. Ideally, watermark 23 would also be precisely aligned to perforations 21 on film 20 to aid in detection and to reduce perceptibility to the human eye, especially if only a segment of watermark 23 is exposed at any given time.

To maintain the productivity of the film manufacturing process, it is desirable to have film 20 continuously moving during exposure of watermark 23. Certainly, it is undesirable to pause film 20 during manufacture to perform watermark 23 exposure. Exposure of watermark 23 onto film 20, which is moving at tens of feet per second, requires exposure times as short as 100 ns to avoid smearing watermark 23 and rendering it unreadable. Such a short exposure time not only places a significant demand on source brightness and power, but also requires exposure in a time domain where film reciprocity failure is likely to occur.

It must be emphasized that exposure is a function of intensity and time. If exposure time can be lengthened, for example, by a factor of 20 or more, the light source intensity requirements are less severe and reciprocity failure can be avoided when printing a watermark pattern such as that shown in FIG. 1. When light source intensity cannot easily be increased, an increase in exposure time can be used to increase exposure. If the exposure time can be increased to minimize reciprocity failure, then reciprocity problems can be avoided. However, because of the speed of fabrication for film 20 and for photosensitive media in general, lengthening the exposure time with watermark 23 of the area type, as shown in FIG. 1, is not feasible because it causes smearing of the watermark and inhibits detection.

Figure 2A:
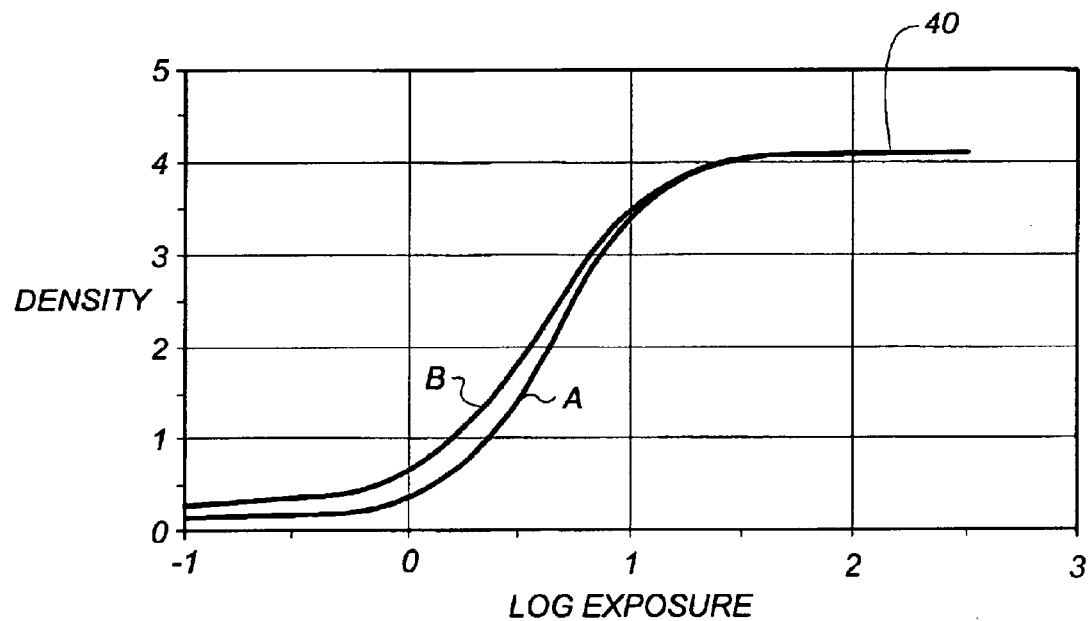
FIG. 2a is a film D log E (density versus log exposure) curve showing the nominal film curve and the curve with added blue watermark exposure.

Another problem related to area watermarks 23 is the need to modify the formulation of film 20 coatings in order to compensate for the contrast and hue shift that occur with watermark application. Referring to FIG. 2a, there is shown a density versus log exposure curve 40 for a conventional motion picture print film as curve A. Curve B shows the effective D log E curve 40 that results once film 20 of this type is pre-exposed with an area coverage watermark 23. It can be observed that overall contrast is reduced, especially in the toe region.

Figure 2B:
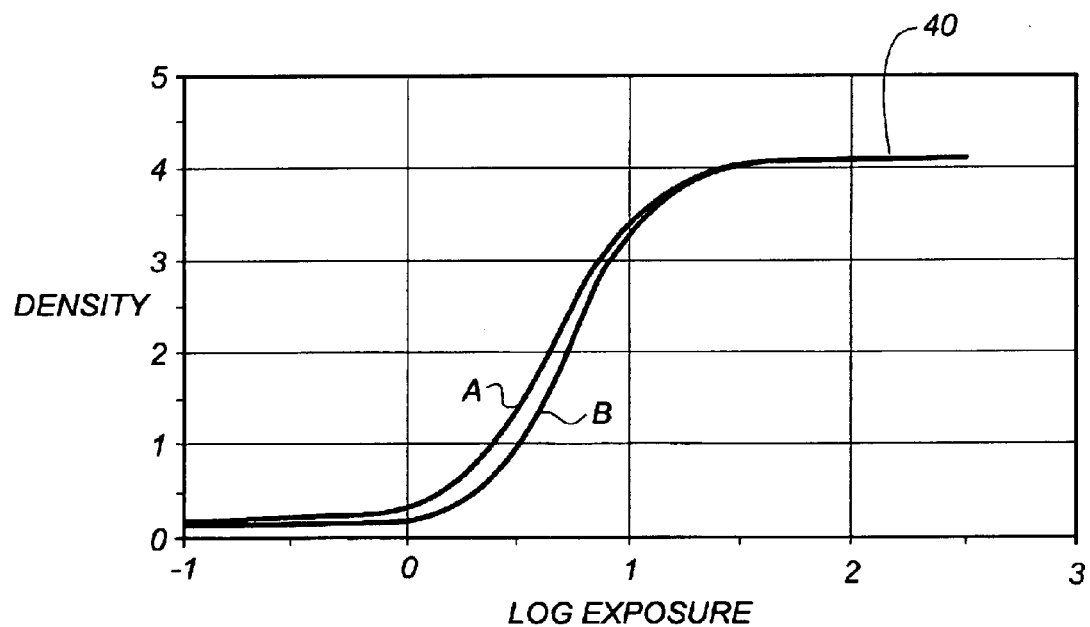
FIG. 2b is a film D log E curve showing the nominal curve and film curve compensated for added watermark exposure.

It may be desirable to apply a watermark to a single film layer. If watermark 23 is only provided in the blue layer, as shown, there is an overall hue shift toward the yellow (dye formed by the blue layer) which can only be corrected to neutral at one density level. FIG. 2b shows how D log E curves for the photosensitive film 20 medium used must be modified in order to compensate for both contrast and hue changes that result from watermarking. Referring back to FIG. 2b, if film 20 is produced with an emulsion characteristic of Curve B, adding watermark 23 results in an effective film D log E curve 20 like that of Curve A of FIG. 2b. However, as is noted earlier in this disclosure, changing emulsion formulations is not desirable. Film manufacturers would be reluctant to alter existing formulas, even when some advantages are weighed against the advantages of achieving and effective watermark 23 application.

Figure 3A:
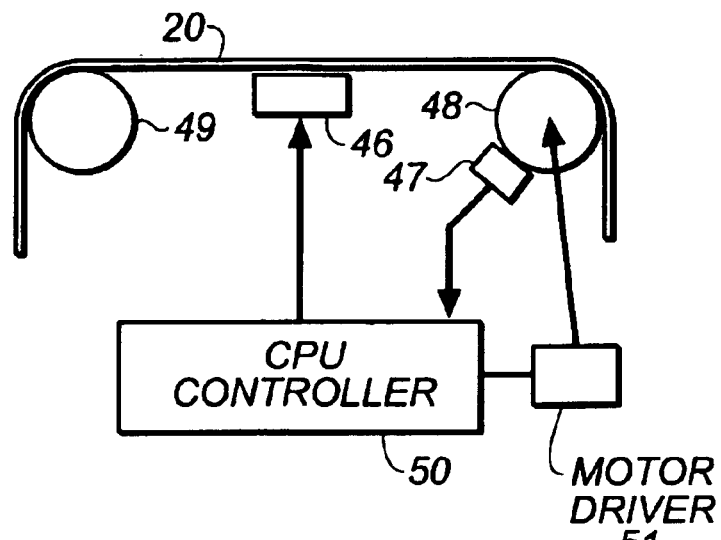
FIG. 3a is a schematic drawing of watermark exposure during film production, where the exposure occurs on a flat surface.
Figure 3B:
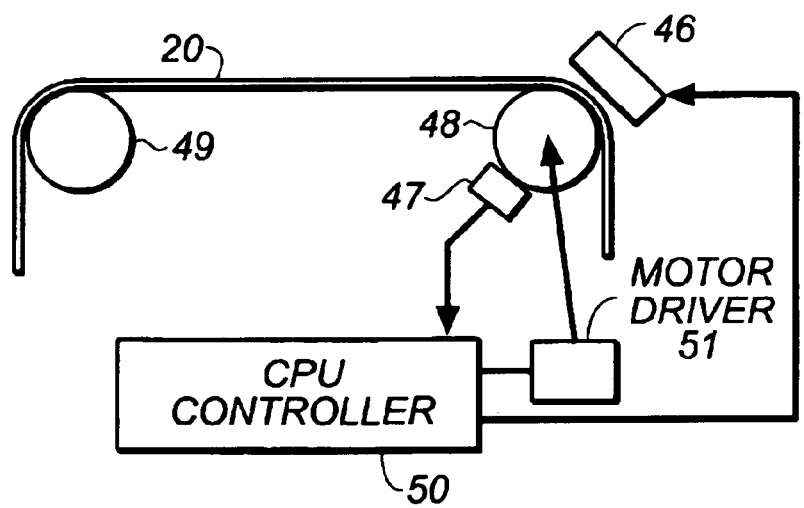
FIG. 3b is a schematic drawing of watermark exposure during film production, where the exposure occurs on a curved drum surface.

Referring to FIGS. 3a and 3b, two alternate configurations for exposing watermark 23 during manufacture of film 20 are presented. FIG. 3a shows an arrangement wherein watermark 23 is applied as film 20 passes over a flat surface. Film 20 is transported past an exposure station 46 passing over rollers 48 and 49. Roller 48 is a capstan drive for transporting film 20 at a precise speed past exposure station 46. An encoder 47 senses the speed of film 20, which is monitored via a CPU controller 50 and a motor drive 51. Rollers 48 and 49, and motor 51 are referred to as a transport or transport system. Flat surface exposure allows an entire frame area to be exposed at one time without a problem of maintaining focus over the entire frame. For this embodiment, film 20 can be continuously moving, requiring very short exposure times. With this setup, exposure station 46, being removed in distance from capstan roller 48, risks undesirable velocity variations in film 20 as it moves past exposure station 46.

As is noted above with reference to FIG. 1, the simplest exposure method employs a "stop and stare" sequence for applying exposure energy to a stationary segment of film 20. This method, however, would require huge accelerations and decelerations of film 20 and negatively impact throughput speed. Thus, a method wherein film 20 is continuously moving is preferred.

FIG. 3b shows a similar setup to that of FIG. 3a, except that exposure station 46 is now located directly on roller 48, minimizing any velocity variations and subsequent misplacement of watermark 23 frames. However, because the image plane is now cylindrical, a depth of focus problem can now occur if attempting to image an entire frame. One solution is to image only a portion of frame 20 at a time or to use a print lens having a curved field. It may also be possible to increase the diameter of roller 48 to provide a flatter surface, but that solution is often impractical, given size and space requirements. It should be recognized that controlling the placement of watermarks 23 to provide a contiguous latent image background requires a very precise encoder 47, typically having tens of thousands of pulses per revolution. This type of precision would be required in order to place successive watermark images on film 20 to within pixel or sub-pixel tolerances.

Figure 4:
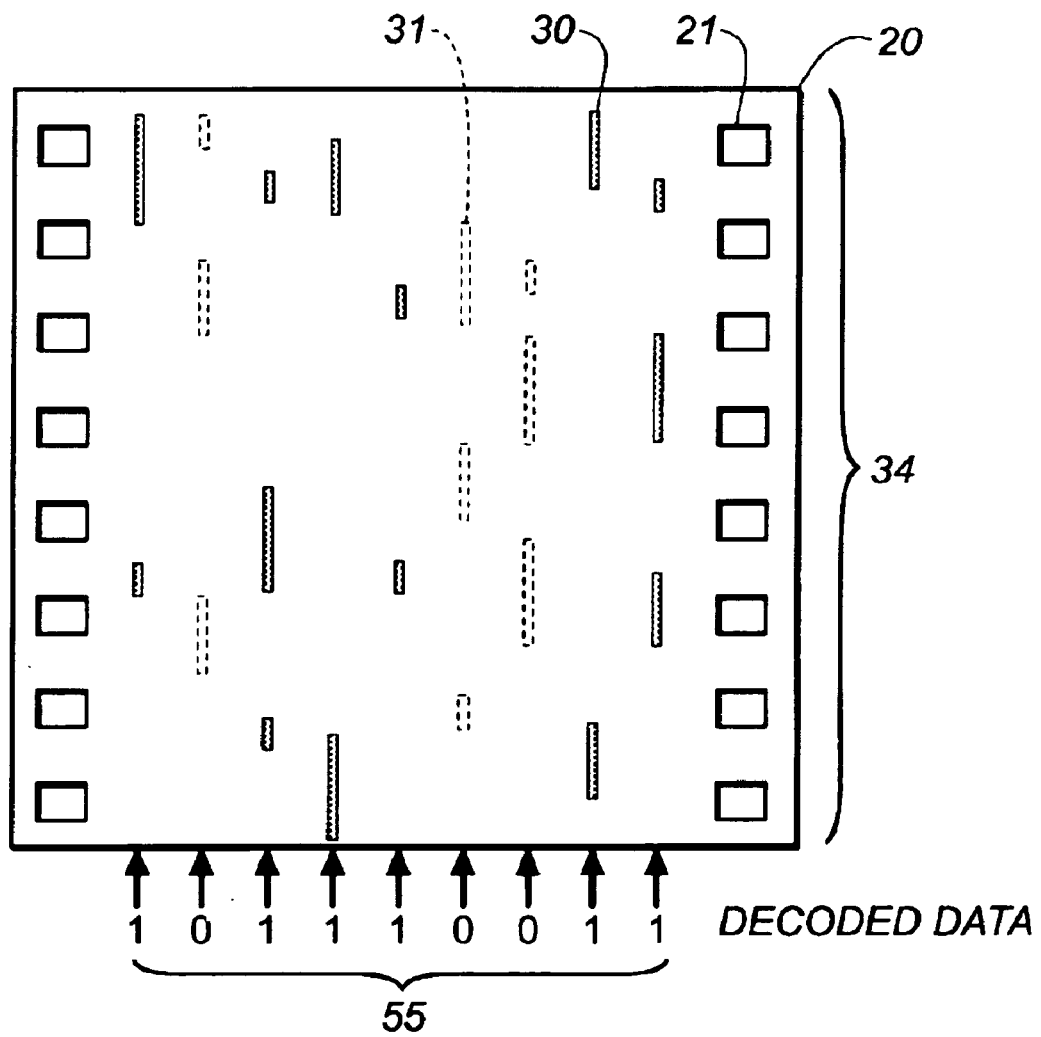
FIG. 4 is a schematic diagram of a spatially sparse watermark of stripes of random length disposed along the direction of transport of the film.

Spatially sparse watermark 34 of the present invention can be casually described as a type of dispersed bar code. Spatially sparse watermark 34 of the present invention consists of a series of random length stripes 30, 31 that are traced along the direction of film 20 motion, as is shown in FIG. 4. While appearing to be random vertically, stripes 30, 31 occur at fixed horizontal locations, or columns 55, along the length of film 20. Sensing of spatially sparse watermark 34 is straightforward: in one method, integrating the information encoded as stripes 30, 31 along a length of film 20 results in a binary (1/0) detection of a density level for each column 55. Pictorial image information, added later when film 20 is exposed at a production studio or editing facility, tends to blend in, so that spatially sparse watermark 34 becomes imperceptible, particularly as scene content changes. Spatially sparse watermark 34 covers only a tiny fraction of the image area and, because it is typically applied over only a single color, has little or no effect on contrast or hue, except in very local areas, immediately at stripes 30, 31.

Drawn larger than to scale in FIG. 4 for visibility, actual spatially sparse watermarks 34 can be as small as one pixel wide and a few pixels long. Typically, a pixel on film 20 may be as small as 10 um. Using a binary representation cuts down on the amount of data needed in order to form watermark 23. Instead of requiring from 8 to 12 bits to generate the two-dimensional noise pattern watermark 23 of FIG. 1, a single bit data 1 or 0 (on/off) can be used. In FIG. 4, the actual recorded watermarks are shown as gray stripes of varying length. When integrated vertically along each column to interpret the watermark, stripes 30, 31 having a certain predetermined duration represent a digital "1." The dashed outline stripes 31 represent where other watermark markings may have been expected, but were not formed, so that a digital "0" data element represents the data at the position of these stripes 31.

In a preferred embodiment, spatially sparse watermark 34 is provided in only one color layer of film 20. For example, if only the blue emulsion is exposed using the present invention, spatially sparse watermark 34 appears as yellow stripes. This particular arrangement is most advantageous, since the human eye has great difficulty in discerning detail in yellow. If the pattern of spatially sparse watermark 34 changes rapidly enough and is held to low exposure levels, the net perceptible effect for such a marking is similar to film grain "crawl" that occurs normally in projected motion pictures, and is effectively hidden within the normal grain structure. Stripes 30, 31 do not need to be synchronized with perforations 21 and need not form a contiguous image; adjacent exposures need not be contiguous with each other within a pixel or less. Note that, for motion picture film 20, the spatially sparse watermark 34 can extend beyond the four perf single image frame 28 shown in FIG. 1.

Using stripes 30, 31 for forming spatially sparse watermark 34 has a number of advantages. For example, referring back to FIGS. 3a and 3b, capstan encoder 47, which required tens of thousands of pulses per revolution for placement of a prior art area watermark 23, now only requires about 100 pulses per revolution for spatially sparse watermark 34 of the present invention. Velocity variation tolerances for the transport mechanism of film 20 are similarly relaxed.

An entire encoding of spatially sparse watermark 34 need not be contained in any one image frame 28. Instead, it can be useful to spread the complete code over multiple frames 28, even over more than a hundred frames 28. The sparseness of its encoding allows spatially sparse watermark 34 to be written on film 20 without the requirement to modify film 20 formulation to compensate for contrast and hue shift, since spatially sparse watermark 34 covers only a very small part of film 20 area. Since stripes 30, 31 are in the direction of travel of film 20 and can be detected even when of random length, smearing is not a problem. Exposure times can be lengthened over multiple frames 28. Pixel resolution can also be reduced.

As long as the pattern of spatially sparse watermark 34 can be kept at or below a threshold of perceptibility, the pattern is acceptable. Applying a "noise" modulation lengthwise along stripe 30 and changing the stripe 30, 31 pattern and related noise patterns often are further techniques that can also be employed in forming stripes 30, 31 to successfully hide spatially sparse watermark 34 in the grain of film 20.

Figure 5:
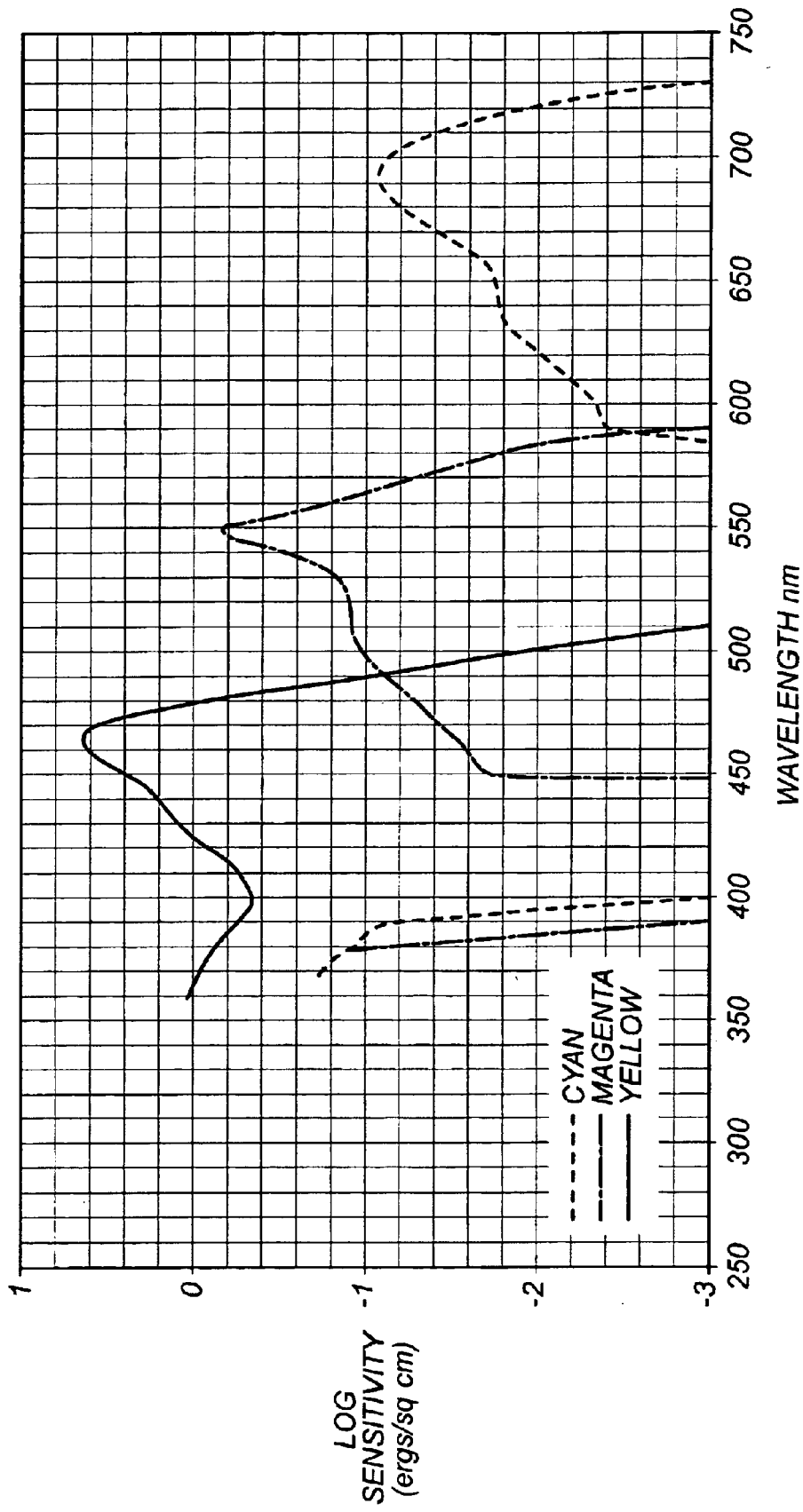
FIG. 5 is a spectral sensitivity curve for the three color layers of a typical color print film.

FIG. 5 shows typical spectral sensitivity curves for a representative type of color print film used for motion pictures. The higher the curve on the vertical axis, the more sensitive is the corresponding emulsion to light of that color. Since the vertical scale is logarithmic, a change from zero to −1 means a 10 times decrease in sensitivity. In general, to attain the same density, green requires 10 times the exposure as blue, and red requires 100 times the blue exposure.

With reference again to FIGS. 3a and 3b, exposing film 20 that moves past exposure station 46 at high speeds requires very short exposure times and very high power levels from exposure light sources. As noted above, transport speed of tens of feet per second can be anticipated, allowing exposure times that may be no longer than about 100 ns. As FIG. 5 suggests, exposure over the blue range reduces the exposure energy and duration requirements by a factor of 100 over using a neutral exposure. For this reason, and because yellow spatially sparse watermark 34 is the color least perceptible to the human eye, it can be seen that it is advantageous to expose with only a blue source.

Figure 6:
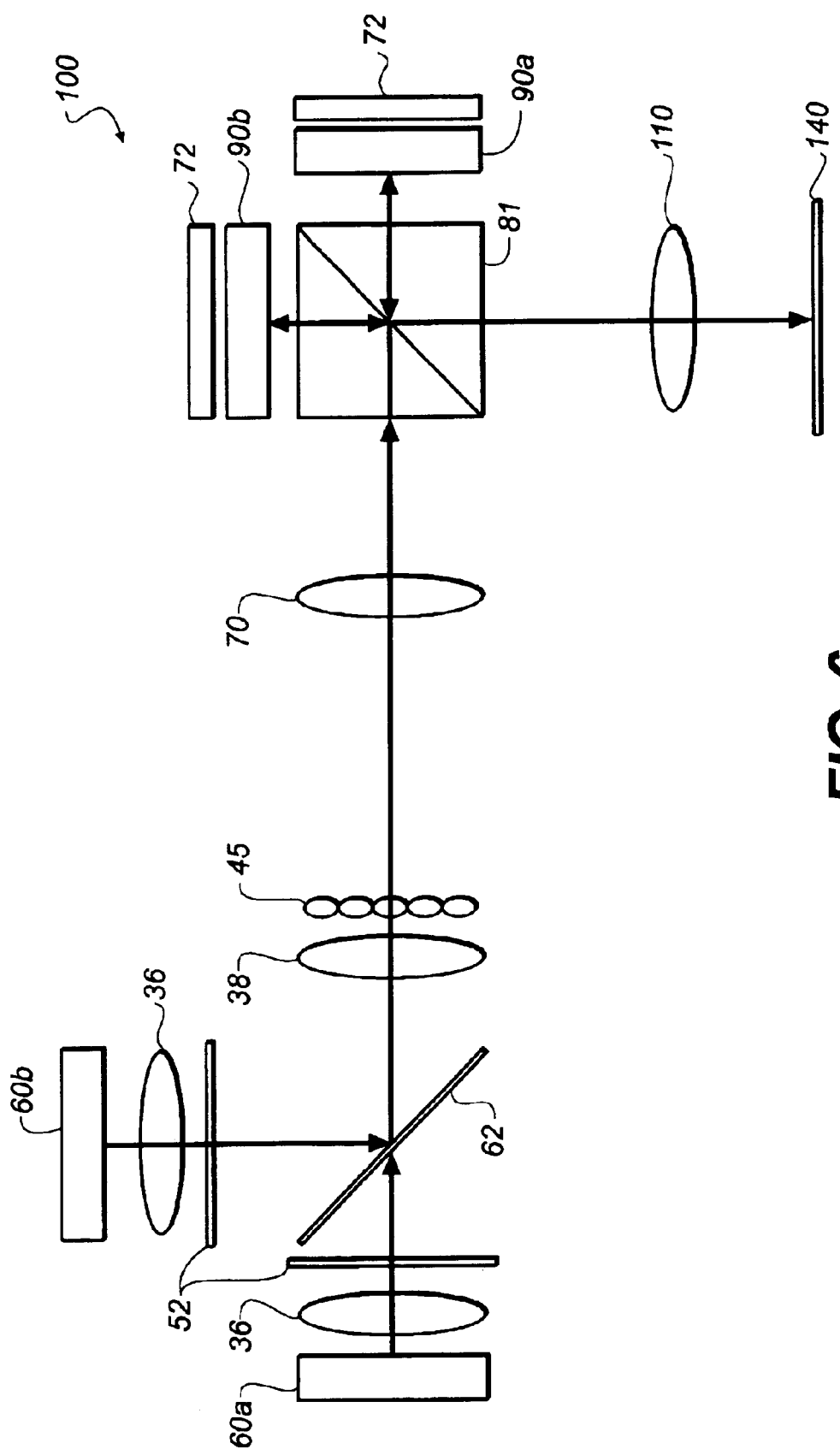
FIG. 6 is a schematic of the writer optics using two orthogonally polarized LED sources and two LCD modulators for imaging onto the photosensitive medium.

FIG. 6 shows a schematic drawing of an optical system that can be used to expose a watermark in the blue emulsion layer. There are two light sources, 60a and 60b, preferably arrays of blue large area LEDs. Light from sources 60a and 60b is orthogonally polarized by polarizers 52, after being directed by lenses 36 to a collimating lens 38. Light sources 60a, 60b are combined onto a common axis by a polarization beam combiner 62. A fly's eye array uniformizer 45 provides uniform illumination to LCD spatial light modulators (SLM) 90a and 90b. The light from source 60b is S-polarized and is reflected from polarization beam combiner 62 and from a polarization beamsplitter 81 and directed toward spatial light modulator 90b where the polarization is rotated on a pixel by pixel basis according to spatially sparse watermark 34 image information on LCD spatial light modulator 90b. The P-polarized image light is directed through polarization beamsplitter 81 and imaged by a lens 110 onto film 20 at a film plane 140. In a like manner, the P-polarized light from LED light source 60a passes through polarization beam combiner 62 and polarization beamsplitter 81 and uniformly illuminates LCD spatial light modulator 90a. The polarization of the incoming light is rotated on a pixel by pixel basis according to spatially sparse watermark 34 image information on LCD spatial light modulator 90a. The S-polarized image light is reflected by polarization beamsplitter 81 and imaged by lens 110 onto film plane 140. Therefore, the light from light source 60b is modulated with the image information of LCD spatial light modulator 90b, and the light from light source 60a is modulated with the image information of LCD spatial light modulator 90a.

The two spatial light modulators 90a, 90b and their two corresponding light sources 60a, 60b can be used in a cyclically alternating or ping pong fashion to expose different spatially sparse watermark 34 images, one LED/LCD combination exposing while the other light source 60a or 60b is off and its corresponding LCD spatial light modulator 90a or 90b, is loading data. This ping pong approach will be explained in more detail. Light sources 60a, 60b can be turned on and off rapidly by changing their drive current. Furthermore, if operated with short pulses and low duty cycles, as would be the case when using an LED, peak pulse current from an LED current driver (not shown) can be, for example, as much as 10 times the rated DC current producing nearly 10 times the brightness without sacrificing component lifetime. The average brightness obtainable from an LED does not change, but the instantaneous brightness does. Film 20 exposure time is very short and is a function of instantaneous brightness; the present invention takes advantage of this fact.

Figure 7:
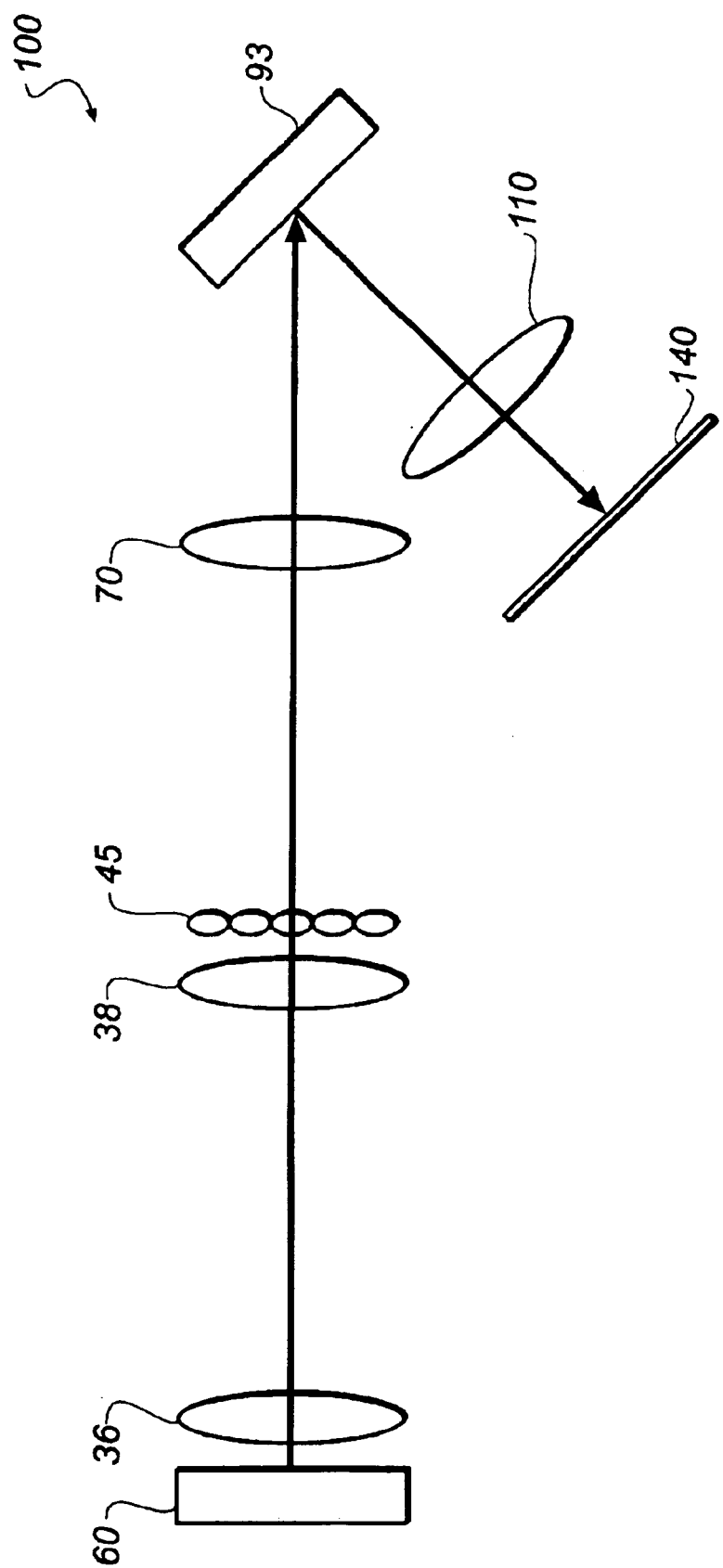
FIG. 7 is a schematic of the writer optics using a monochromatic LED array and a single DMD (Digital Micromirror Device) to expose a latent watermark onto the photosensitive medium.

The reflective LCD shown in FIG. 6 is not the only type of spatial light modulator that can be utilized. As another spatial light modulator, FIG. 7 shows a schematic drawing of a printer optical system which utilizes a digital micromirror device (DMD) manufactured by Texas Instruments, Inc., of Dallas, Tex. as a spatial light modulator 93 instead of an LCD type spatial light modulator as was shown in FIG. 6. Relative to LCD technology, the DMD has the advantage of fast switching speeds and does not require polarized light. Each micromirror in a DMD array has two positions, imaging or non-imaging, and relies on pulse width modulation to achieve gray scale. However, using the method of the present invention, spatially sparse watermark 34 can be formed using a single bit on/off exposure, so that gray scale need not be required. An LCD capable of providing a gray scale image would be able to expose a sinusoidally modulated stripe 30, 31 that would be less perceptible. Such a pattern may be difficult or impractical to achieve using a DMD. The LCD requires from several milliseconds to tens of milliseconds to switch watermark patterns, an operation the DMD can accomplish in tens of microseconds. It is worthwhile to note that changing spatially sparse watermark 34 pattern often is a perceptibility concern, not a watermark detection and readability concern.

Referring to FIG. 7, the light from light source 60, is directed by a field lens 36 to collimator lens 38 and is uniformized by lens array uniformizer 45. The uniformized light is directed by a condenser lens 70 to illuminate a DMD spatial light modulator 93. Voltage activated mirrors in DMD spatial light modulator 93 are activated on a pixel by pixel basis to send image light to print lens 110 which focuses the image onto film plane 140. Images of different watermark patterns can be changed rapidly with DMD spatial light modulator 93. The short time interval needed for changing spatially sparse watermark 34 from one pattern to the next does not interfere with the detection and readability of spatially sparse watermark 34. Thus, because of this switching speed, ping-pong operation would not be needed when using a DMD spatial light modulator 93.

Referring to the LCD SLM approach of FIG. 6, there are two timing constraints associated with LCD operation. One limitation relates to risetime of the device, to be addressed subsequently. The other relates to the amount of time needed to refresh the device or to load image data. Maximum digital data rates impose a limit upon how quickly a full 8- or 10-bit image can be updated. For example, an ultra-high resolution QXGA SLM device from Victor Company of Japan, Ltd. (JVC), headquartered in Yokohama, Japan, providing 2048 pixels by 1536 lines, currently completes an image load or refresh at a rate of 100 Hz, that is, every 10 ms. It might be desirable to change the watermark 34 image every four image frames 28 (every 16 perfs on film 20), with an image frame 28 being exposed about every millisecond, and with the actual exposure time being a few microseconds. Six exposures are required for every four-perf image frame 28 on the film 20, as described in detail below.

Figure 8:
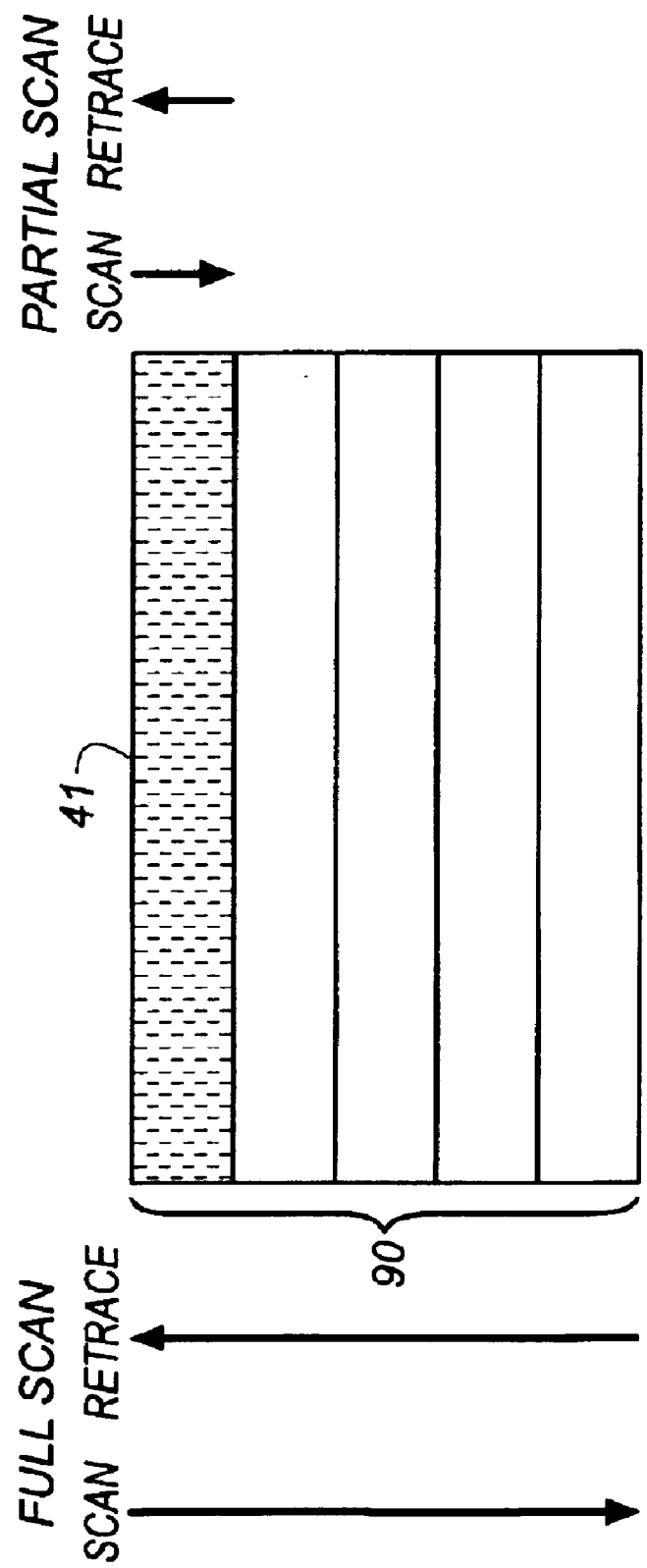
FIG. 8 shows a partial frame scan for refresh of a portion of the full LCD in one embodiment.

It is desirable to find a way to speed up the load/refresh time. Referring to FIG. 8, the image surface of LCD spatial light modulator 90 is shown divided into six swaths 41, each swath 41 being 2048 pixels across and 256 lines long. Using this arrangement, instead of scanning all pixels of LCD SLM 90, from top to bottom, that is, all 1536 lines, a retrace pulse could be issued after 256 lines. As a result, the lines count would be reset and the image data would start loading again, from the top. This would reduce the 10 ms load time to about 1.6 ms. Only the top sixth of the device, shown as swath 41, would contain useful information with the rest of the pixel locations either disabled or filled with zeroes. With reference to FIG. 6, LCD SLM 90 could then be physically offset to center the useful swath 41 on the optical axis, modulating one sixth of LCD SLM 90 pixels. Six exposures, spaced over a millisecond would be needed to expose a full frame 28 area on the film, four perfs. This partial frame scan would speed up loading and the partial frame exposure, using only one swath 41, could avoid depth of focus problems when writing on a curved surface (as in the embodiment shown in FIG. 3b).

Figure 9:
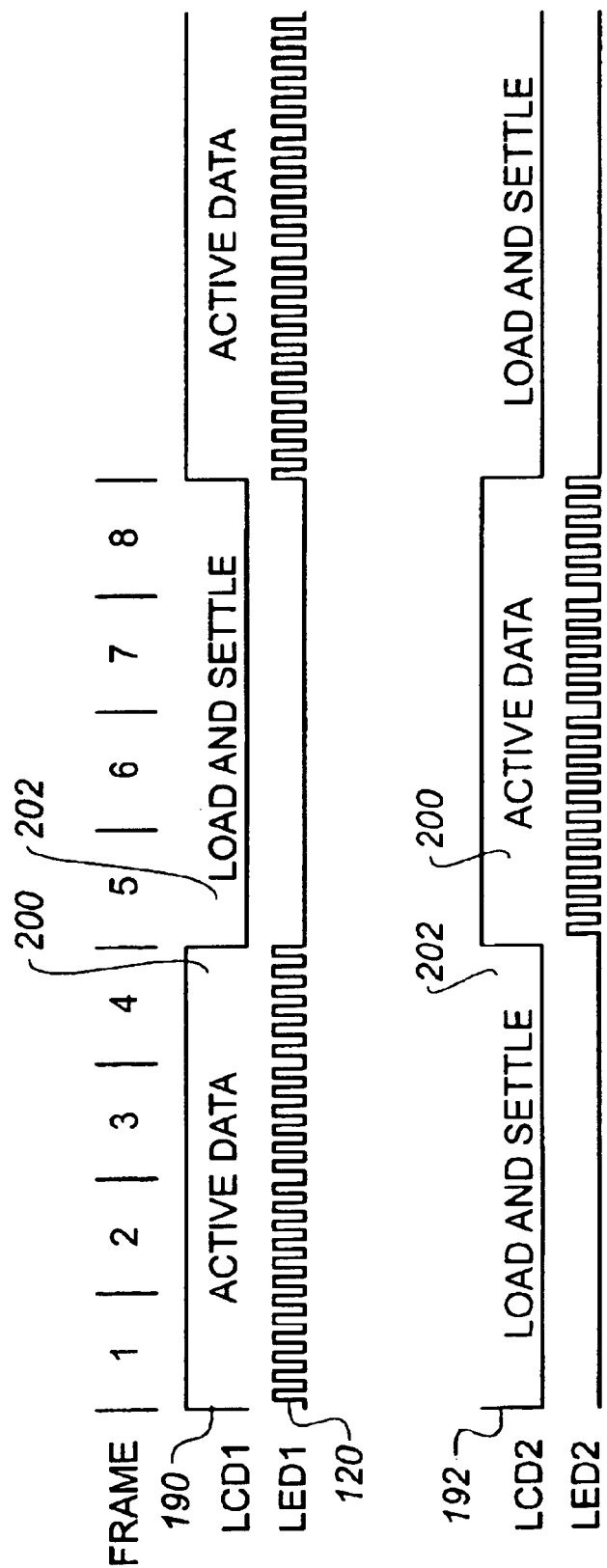
FIG. 9 is a timing diagram for the writer in FIG. 6 showing the timing wherein the loading and exposing of watermark data alternates between the two LED arrays and the two LCD modulators.

Referring to FIG. 9, a timing diagram is shown, with timing to provide six exposures per frame while using an alternating cyclically alternating or "ping-pong" approach as in film writer 100 of FIG. 6. FIG. 9 shows timing for exposure of eight frames using two LCD spatial light modulators 90a, 90b, one exposing while the other loads data. Frame timing is shown at the top of the figure. Here, first LCD spatial light modulator 90a, with a timing waveform 190, already loaded with data, provides its exposure pattern during an exposure cycle 200. During this same interval, the other LCD spatial light modulator 90b, with a timing waveform 192, is loading data during a load cycle 202. The LED array used as light source 60a (FIG. 6), is turned on for short pulses 120, six per frame. Using the scheme described with reference to FIG. 8, data displayed on LCD spatial light modulator 90a or 90b only modulates a portional swath 41 in order to do a fast refresh. The first exposure is made, taking a few microseconds. Then LED light source 60a is turned off. During this first exposure, film 20 moves the distance equivalent to 256 lines of pixels. At 1 millisecond per image frame 28, this operation takes about 170 microseconds. Then, LED light source 60a is turned on again for another few microseconds. This process is repeated until four frames, 24 exposures have been made. Meanwhile, as shown by timing waveform 192, second LCD spatial light modulator 90b loads new data during load cycle 202 and the device allowed to settle. Once the first LCD spatial light modulator 90a has finished writing four frames it is reloaded with new data, during its next load cycle 202, and the second LED array is turned on as light source 60b to expose film 20 using the second LCD spatial light modulator 90b, using six exposures per frame. The "ping pong" timing process repeats in this manner, with LCD spatial light modulators 90a and 90b alternately exposing and loading in this way.

Of course, it is possible to use other data loading and timing arrangements suitable to specific types of LCD spatial light modulator 90 or to manufacturing equipment characteristics for film 20. For example, one fourth of an LCD array within LCD spatial light modulator 90 could be loaded as swath 41 and four exposures could be used per frame 28. Or, the ping pong alternation between two LCD spatial light modulators 90a and 90b could occur within one frame 28. The latter approach would not allow a full settle time with LED light source 60a or 60b off, but this overall watermarking approach is relatively insensitive to whether LCD spatial light modulator 90 is completely settled or one pattern is being introduced to replace an earlier one. Again, perceptibility of the markings is a key consideration. The above techniques of partial refresh, ping pong, and pattern change within an image frame 28 are not limited to LCD devices, but can also be applied to a DMD device.

It is desirable to use off the shelf devices as LCD spatial light modulator 90 where possible. Most LCD devices used for exposure printing are of twisted nematic (TN) type or use a vertically aligned type of LC material. Ferroelectric LC materials, although available and much faster than other types, are presently not commonly available in medium to high resolution devices.

Another key time sensitive concern for LCD spatial light modulators 90 relates to the rise and fall time of the liquid crystal material itself. Rise time refers to the interval between application of signal voltage to an LCD pixel and effective reflectivity rise from 10% to 90% of a final level. Fall time is similarly measured for a drop from 90% to 10%. Table 1 shows the effect of temperature and code value on risetime for one type of LCD modulation device. The time given in the table is the rise time to transition from a code value of zero to the code value shown in the table, for a given temperature.

TABLE 1

| | Risetime ms | |
|---|---|---|
| Code value | 45 C. | 23 C. |
| 1000 | 9 | 17 |
| 800 | 18 | 25 |
| 512 | 23 | 45 |
| 200 | 16 | 38 |
| 100 | 10 | 23 |

For this particular device, risetime can be reduced by half at 45 degrees C. For this purpose, an optional heater 72 can be provided for LCD spatial light modulator 90a or 90b, as is shown in FIG. 6. The risetime is also a strong function of the code value sent to the device. In this 10-bit system, using LCD spatial light modulator 90a or 90b having the data sense used for Table 1 (1000 being high, 0 being low) the interval with low counts around 100 and high counts around 1000 provides the shortest rise times. With an LCD spatial light modulator 90a or 90b having rise times as shown in Table 1, high counts represent a high effective reflectivity and are therefore more desirable for providing suitable exposure levels. With the proper choice of light color and setup voltages, rise times as short as 4 ms have been measured.

Figure 18:
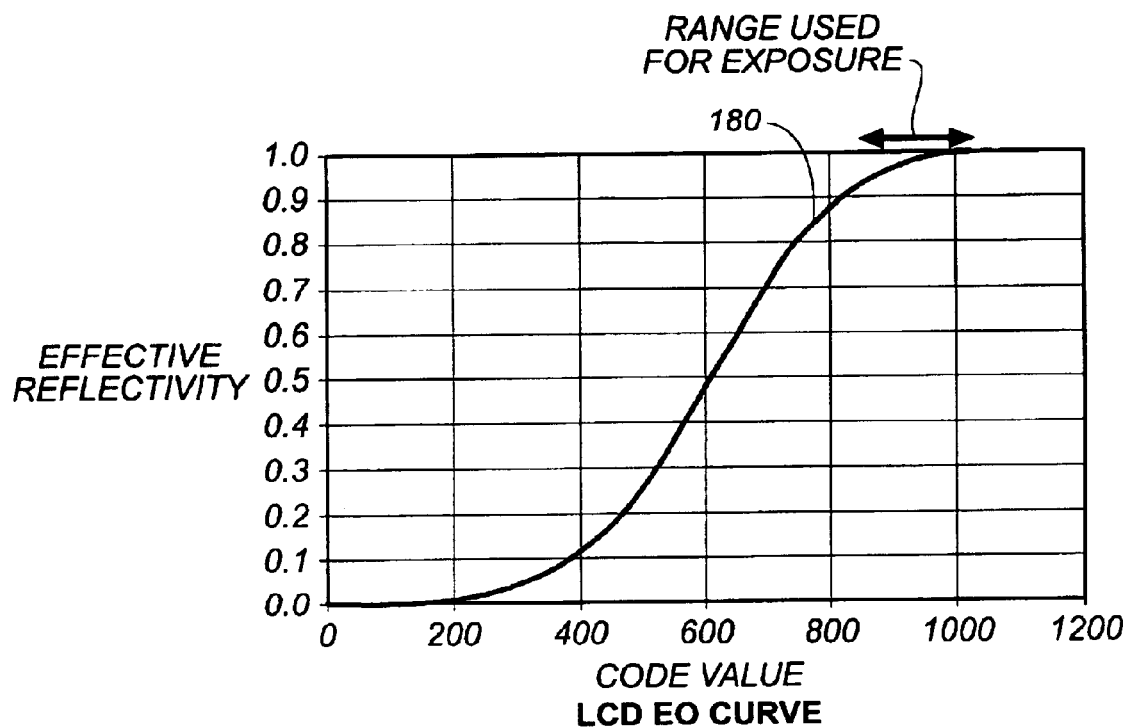
FIG. 18 is a graph showing the Electro-Optic (EO) curve having relative intensity from an LCD modulator vs. input digital image Code Values, indicating that maximum brightness and maximum device speed can be obtained by using only the upper portion of the curve.

FIG. 18 shows an electro-optic (EO) curve 180 for an LCD spatial light modulator 90 having 10-bit resolution. Here, effective reflectivity is plotted vs. code value. The range of data values desirable for watermark application, based on risetime and exposure considerations, are in the 900 to 1000 range. This range of code values provide fast risetime, as shown in Table 1 above, and provides much more light output than does the 0 to 100 value range, which also has a short risetime. In a 1-bit system, a 1000 code value might correspond to a binary "1" being written in the exposed pattern. Conversely, a code value of 0 would probably be used to represent a "0" or no exposure. If a 2- or even 4-bit system is desired from a visibility standpoint, then 4 to 16 values can be mapped to the 900 to 1023 code values via a look up table (LUT), as is well-known in the imaging arts.

Unlike the two-dimensional approach for area watermark 23 given in FIG. 1, the detection and readability of spatially sparse watermark 34 of FIG. 4 is relatively independent of smear, and fairly independent of resolution. Full 2048×1536 resolution of LCD spatial light modulator 90 would not be required to write spatially sparse watermark 34 of FIG. 4. This relative insensitivity can be utilized to increase film exposure.

Exposure on the Surface of Film 20

As is well known, film exposure is the product of the light intensity impinging on the film and exposure time:

$$E = I \times t$$

where E is exposure in energy density units (typically ergs/sq. cm), I is the light intensity (watts/sq. cm), and t is time (seconds). As this relationship shows, if light intensity I is at a practical maximum, exposure E can be increased by increasing exposure time.

Figure 10A:
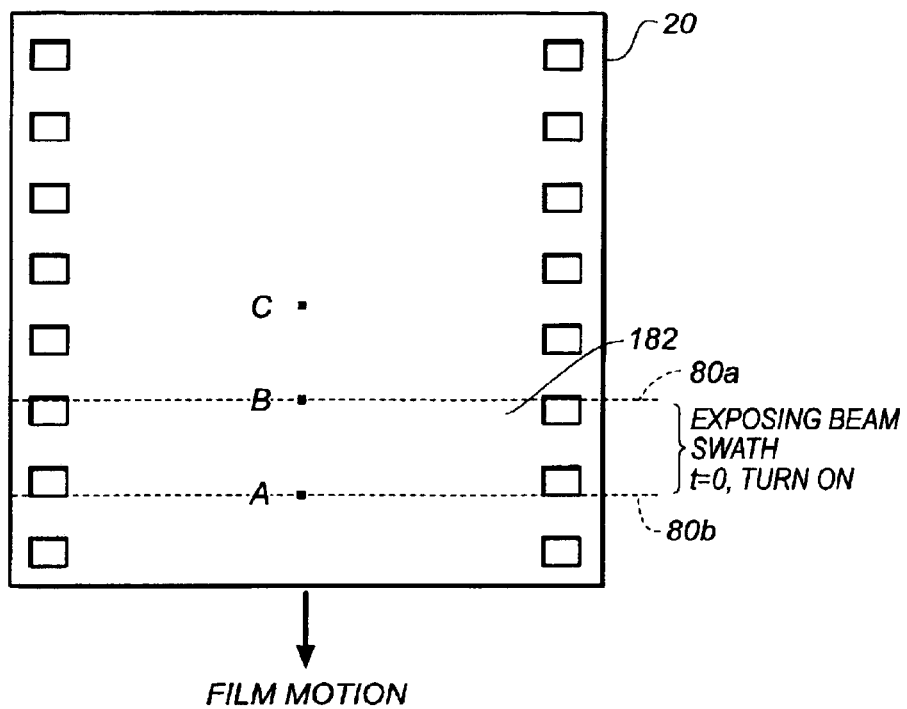
Figure 10B:
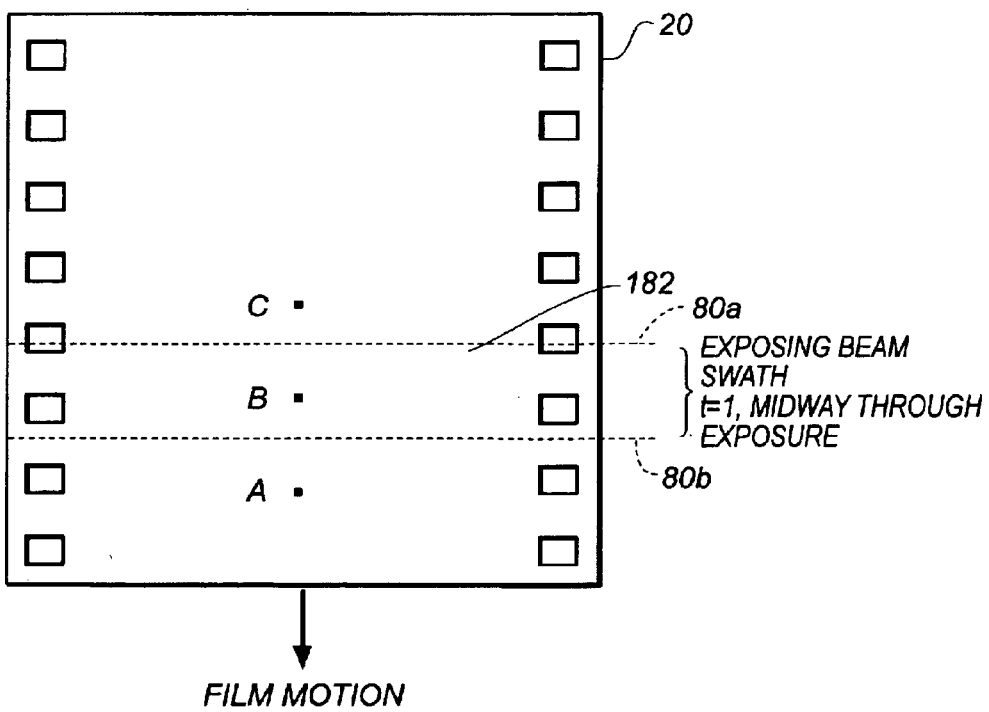
FIG. 10b shows the same locations and the exposing swath of light midway through the exposure.
Figure 10C:
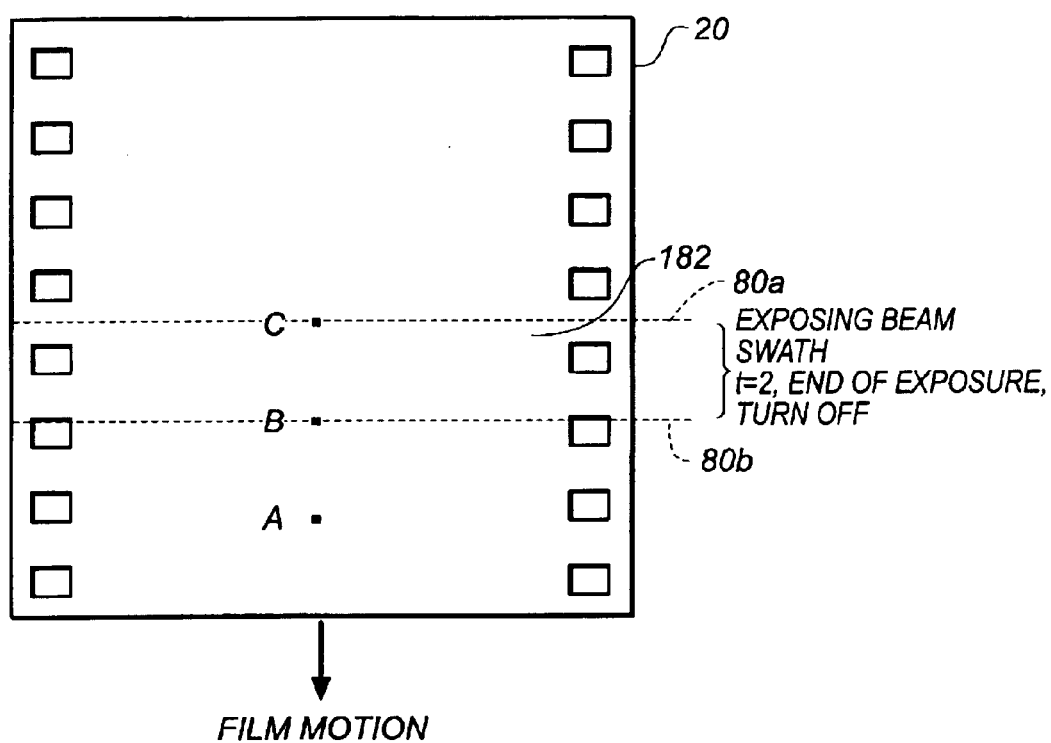
FIG. 10c shows the same 3 locations and the light swath at the end of exposure, just as the light is turned off.

It is instructive to consider the accumulated exposure energy that is received on the surface of film 20 during a typical exposure cycle. Referring to FIG. 10a, three locations, A, B, C, are shown on the surface of moving film 20. During exposure, it can be assumed that a swath 182 of uniform intensity exposing light is applied to film 20. Swath 182 has top and bottom edges 80a and 80b, represented using dotted lines. The exposing light is confined to the region between top and bottom edges 80a and 80b and covers at least the whole width of film 20, edge to edge. FIG. 10a shows the location of film 20 receiving swath 182 just as the exposing light energy is applied. Note that location A is at one edge 80b of swath 182 and location B is at the other edge 80a. Location C initially receives no exposure light. FIG. 10b then shows the situation midway during the exposure time. Because of film 20 motion (in the direction of the arrow shown), swath 182 is now centered on location B. At this instant, neither locations A nor C see any exposure light. FIG. 10c shows the situation at the end of the exposure period, just as the light source is turned off. Location C is now under swath 182, but just at the very edge 80a. That is, location C is just starting to be exposed as the exposure light is shut off. Locations A and B are receiving no exposure energy at this point. Location B is along edge 80b and has just stopped receiving exposure energy.

Figure 11B:
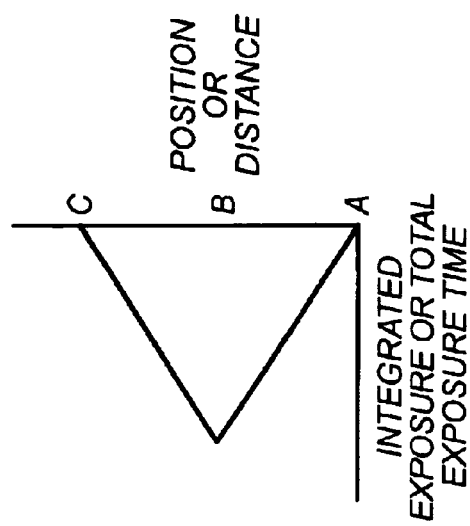
FIGS. 11a and 11b show the resulting integrated exposure of the film medium created by the light swath and the film motion of FIGS. 10a–10c.
Figure 11A:
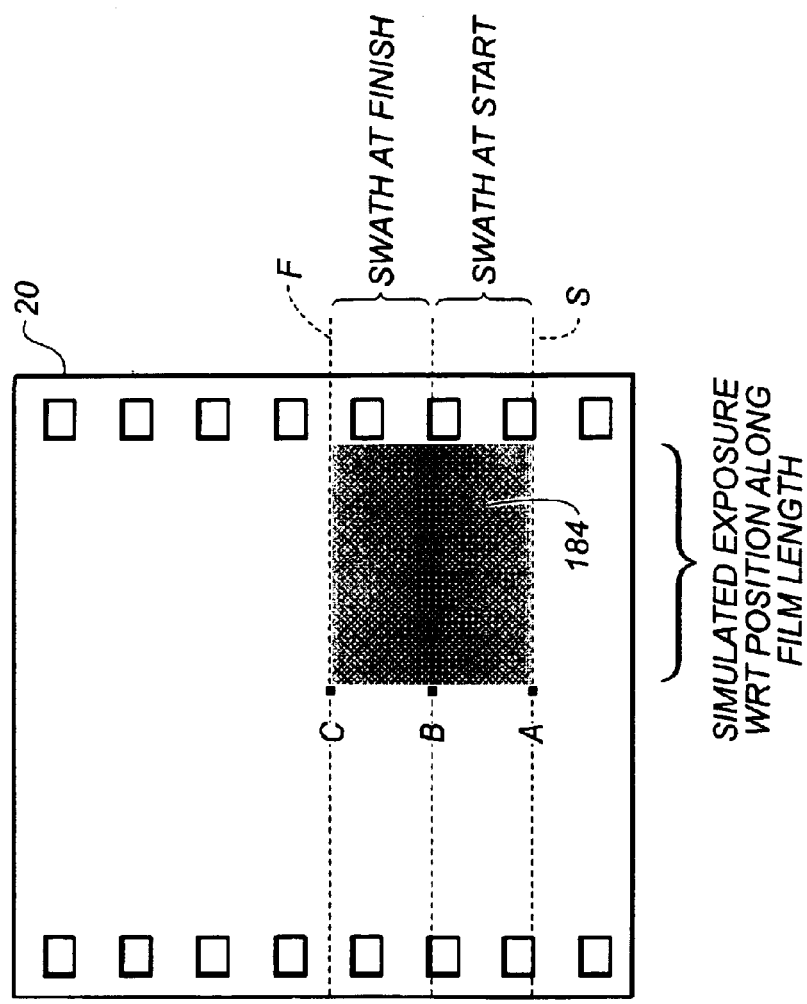

FIGS. 11a and 11b show the effect of accumulated exposure relative to the three positions A, B, and C. The dotted lines S and F respectively represent the start and finish position of the exposing swath with respect to positions A, B, and C, as shown. A patch segment 184, shown on the right side of the film, indicates the relative amount of exposure energy obtained from integrating the light at each position for the full time of the exposure. Darker regions are used to represent more light or higher exposure. This exposure was received by the entire width of the film, but patch segment 184 is shown only on the right side, so that locations A, B, and C can be represented on the left. As FIG. 11a suggests, location B, illuminated throughout the entire exposure time, therefore has the highest exposure level. Location A, receiving exposure light only at the very beginning of this process, barely shows any energy received. Location C did not have light impinging on it until the very end of this process, just as the exposing light swath 182 was turned off. The integrated exposure at points A and C is at a minimum. The graph of FIG. 11b shows a plot of integrated exposure vs. film position or distance along the film corresponding to FIG. 11a. Since the light intensity is constant throughout the exposure, the y axis represents the total exposure time at any location. Note that the exposure in FIG. 11a and FIG. 11b ramps up to a maximum in the center and the falls to a minimum at each edge of the exposed region.

Referring to FIG. 12, there are shown three types of exposing "spots" or "bright areas" on LCD SLM 90, shown by shaded regions: a 1×1 spot 130, a 1×2 spot 132, and a 1×10 spot 134. For forming 1×1 spot 130, one possible exposure sequence is shown in FIG. 10b. Here, the square pixel of 1×1 spot 130 is created as a bright area of 15 um×15 um on LCD spatial light modulator 90. Light source 60, an LED in a preferred embodiment, is turned on for the time it took to move one pixel length, one microsecond for this example. The pixel sizes and exposure times are examples only, given to aid understanding.

Figure 13B:
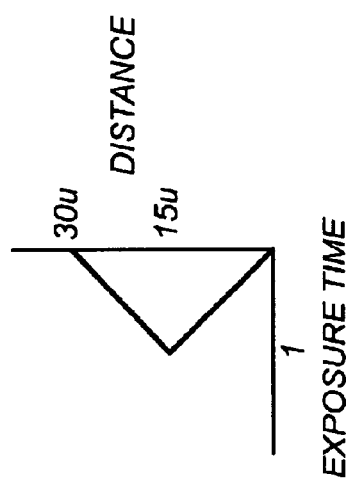
FIGS. 13a and 13b show the exposure obtained using a 1:1 aspect ratio (square) spot and a nominal LED on time of 1 us.
Figure 13A:
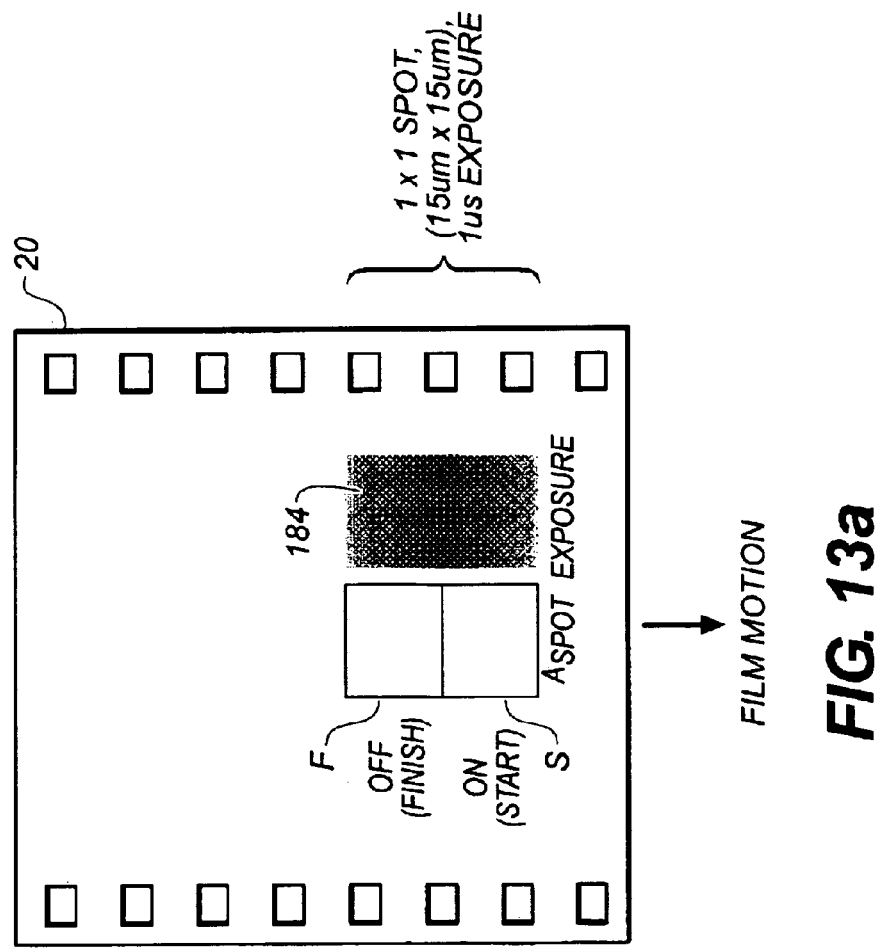

FIGS. 13a and 13b show the relative sizing and timing considerations for forming a 1×1 square aspect ratio spot on film 20 and shows the simulated exposure with respect to position along the length of film 20. As the simulated exposure pattern of patch segment 184 shows, the spot is shown horizontally centered on the film. A start position S and a finish position F are offset vertically due to film motion during the exposure period. These positions indicate positionally where the LED 60 light is turned on (S) and then turned off (F) while the 1×1 pattern of bright region is active on LCD spatial light modulator 90. If the spot is 15 um×15 um and the film motion is at 15 um per microsecond, then in one microsecond the spot will be exposing a film region exactly one spot height away from its start position. The graph of FIG. 13b shows the triangular exposure profile corresponding to the exposure sequence used in FIG. 13a, showing the integrated exposure on the film created by this moving spot. This profile is similar to that shown in FIG. 11b. One axis is given in exposure time, where the maximum exposure is 1 us. The other axis is given in distance (um) from the leading edge of the exposed region on the film. The exposure starts from zero and ramps up to a maximum of 1 us in the middle of the stripe and then ramps down to zero. In one embodiment, the resulting stripe on film 20 is approximately 30 um long and 15 um wide, dark in the middle and fading out at start and finish. As was described with respect to FIGS. 11a and 11b, the beginning and ending points of the exposed patch segment 184 receive very little exposure. The center of the stripe is exposed for the full 1 us period, giving an exposure peak of 1 us as shown in the graph of FIG. 13b. The exposure ramps up for 15 um, then ramps down for the next 15 um.

Figure 14B:
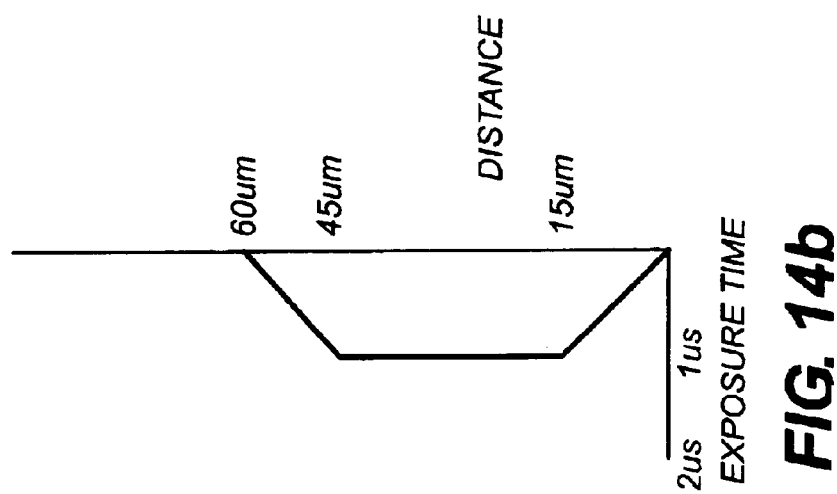
FIGS. 14a and 14b show that the maximum exposure does not increase, with the same square spot of FIG. 13a, with LED on time increased by 3x.
Figure 14A:
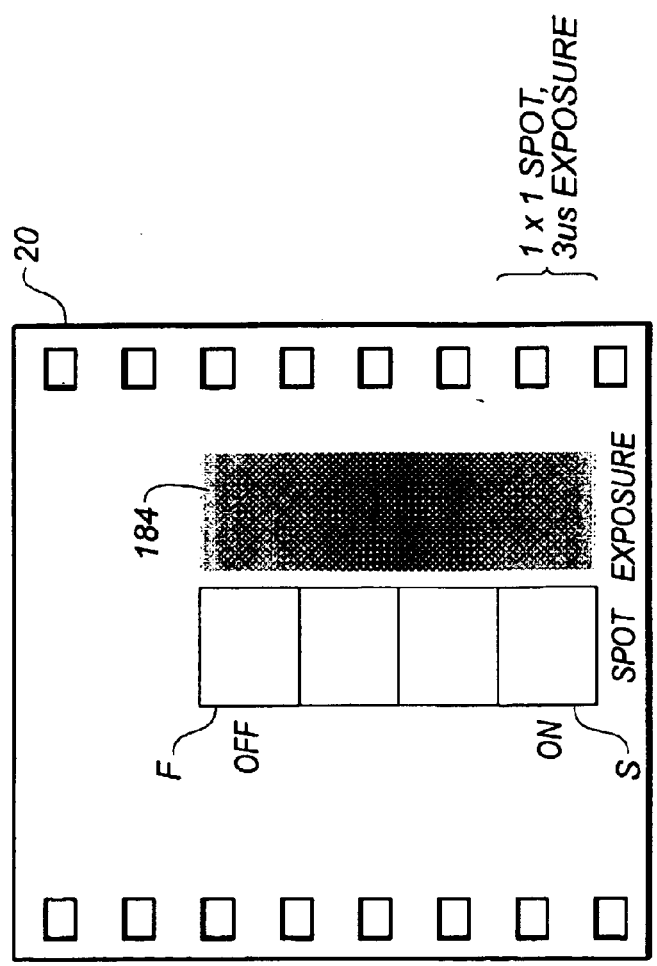

Referring next to FIGS. 14a and 14b, the same 1×1 pixel used for the results of FIGS. 13a and 13b is activated, but the LED light source is on for a longer period, 3 microseconds. This is time required for the exposure source to move three pixel lengths along the film. The resulting motion and film exposure on patch segment 184 is shown in FIG. 14a. Start and finish locations S and F for the 1×1 pixel are shown in solid boxes and dotted lines show an intermediate smear region. Using this longer exposure interval, the vertical extent of the exposed region is now four times the height of the exposing spot, as indicated by patch segment 184 in FIG. 14a. The graph of FIG. 14b shows exposure versus distance. The exposure ramps up and down in 15 um distance, as in the case of FIG. 13b; however, in FIG. 14b the profile is now trapezoidal instead of triangular, ramping up to a maximum level and staying at that level for a while before ramping down. Even though the LED is on for three times longer than in FIG. 13a, the maximum exposure time seen by any point on film 20 is still only 1 us. The resultant stripe length using this longer exposure period is now 60 um long instead of 30 um. Smearing the spot beyond its height does not result in increased exposure.

Figure 15B:
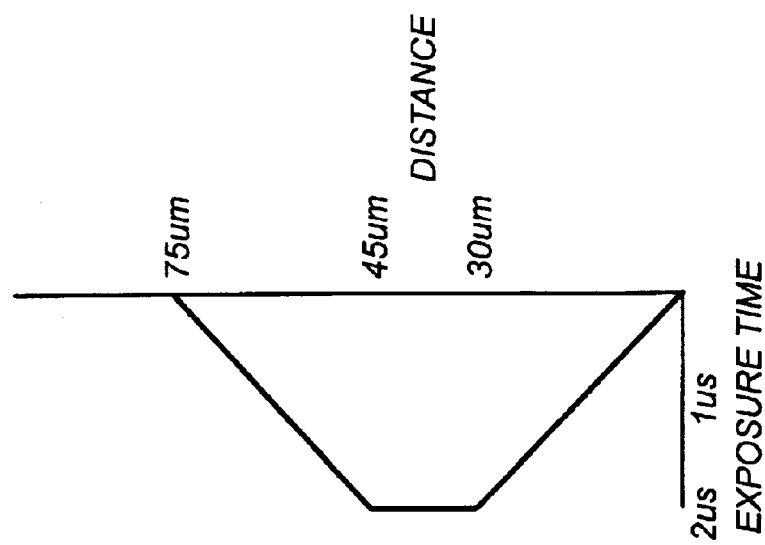
FIGS. 15a and 15b show how the maximum exposure can be doubled by using a 2:1 aspect ratio spot with an increased LED on time.
Figure 15A:
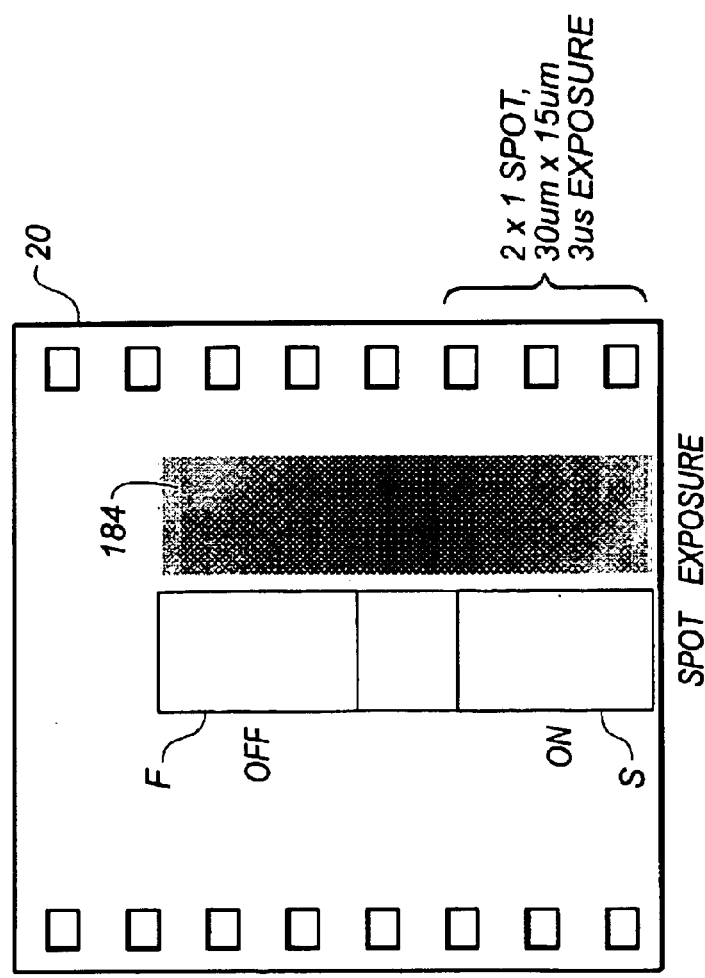

FIG. 15a shows how patch segment 184 is formed when the 1×2 pixel 132 exposing spot of FIG. 12 is used on LCD spatial light modulator 90 and the LED light source is again energized for 3 us. The exposing source size is now 30 um in the direction of motion. The graph of FIG. 15b shows that the maximum exposure is now doubled to 2 us. The ramp up and ramp down distance has also doubled, and the length of patch segment 184 on film 20 has increased to 75 um. The 2×1 spot moves its vertical height in 2 us. The exposure time builds to 2 us and then flattens out before ramping down.

Using an elongated exposing area on LCD spatial light modulator 90, the maximum exposure on film 20 can be increased by increasing the exposure time. With the appropriate adjustments the on time of an LED light source, using 1×10 spot 134 shown in FIG. 12 can result in a 10× increase in film exposure. This increased exposure and exposure time can be used to lower the demands on light source brightness and to avoid the reciprocity failure exposure time region of the film, which tends to be more pronounced at exposure times of 1 us or less.

Figure 16B:
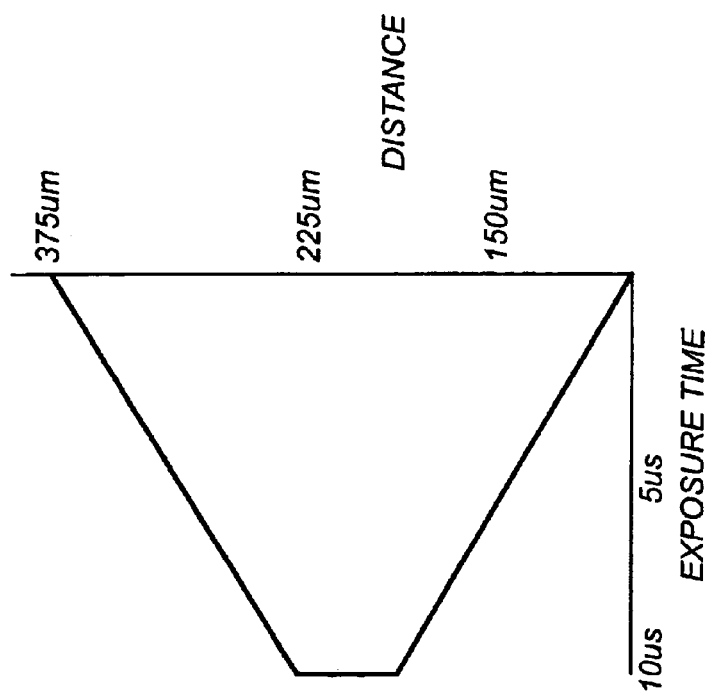
FIGS. 16a and 16b show how exposure can be increased by a factor of 10 by using a 10:1 aspect ratio spot and increased LED on time.
Figure 16A:
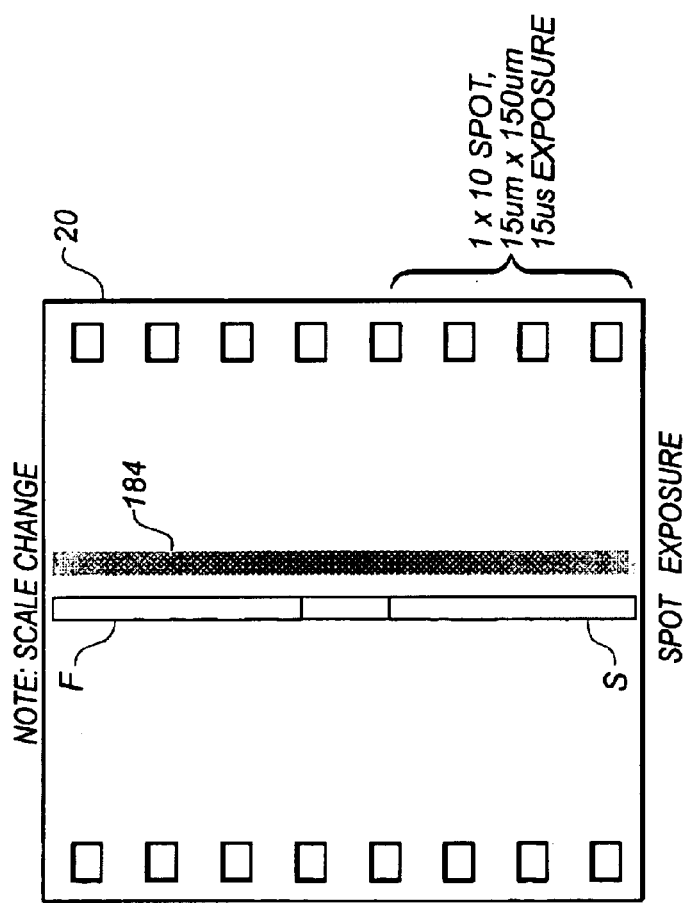

FIG. 16a shows how a 10× exposure increase over that of FIG. 13a can be obtained. The spot or bright region on the LCD used is the 1×10 spot 134 shown in FIG. 12. To be consistent with previous examples, the resulting exposed area would be 15 um wide and 150 um long. With film 20 moving at 15 um/us, as in the previous examples, and LED light sources on for 15 us, the spot motion along the film is 225 um during exposure. In FIG. 16a, patch segment 184 is reduced in scale from the preceding examples of FIGS. 13a, 14a, and 15a. The exposure pattern will be as shown by patch segment 184, where the maximum exposure time is now 10 us, 10 times longer than in FIG. 13a. Of course, the resulting stripe is longer (375 um) and the visual perceptibility of the longer stripe may be objectionable in some applications.

As FIGS. 13a, 14a, 15a, and 16a show, increasing the aspect ratio of the active area on LCD spatial light modulator 90, along with an appropriate increase in on-time of the LED light source results in an increased exposure on film 20 that is proportional to the aspect ratio increase. Any "smearing" of an exposed region on film 20 should not result in a loss of readability of the encoded data. Such a smearing technique is viable for the encoding method for obtaining spatially sparse watermark 34 of FIG. 4 but is not readily applicable to the prior art method for obtaining area watermark 23 of FIG. 1.

Figure 17:
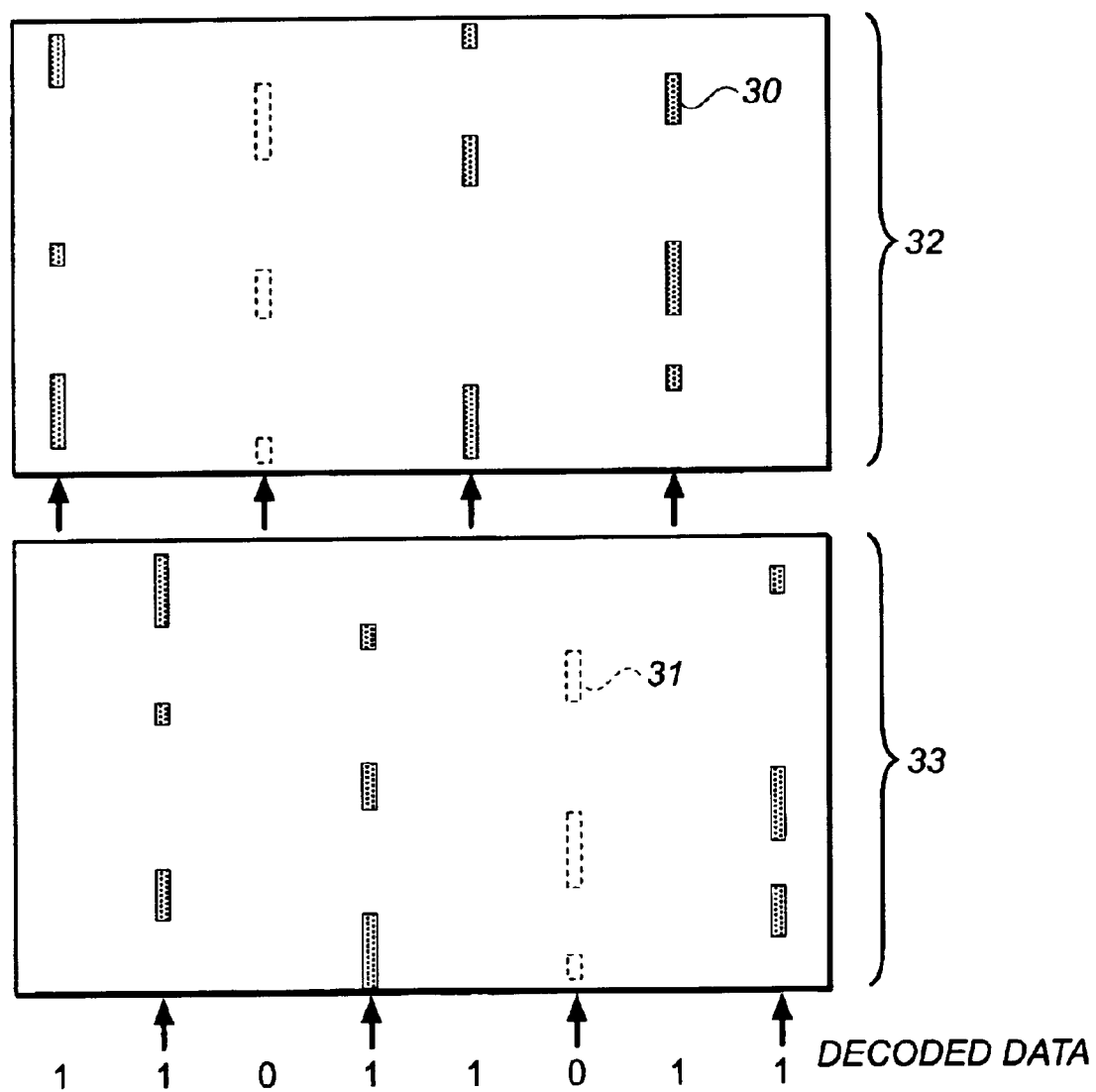
FIG. 17 shows data interspersed or interleaved between two spatial light modulators in order to reduce perceptibility.

There are a number of ways to make larger stripes on film 20 less perceptible. For example, different spot patterns exposed by two LCD spatial light modulators 90a and 90b could be used. The patterns shown in FIG. 6 can be interleaved and changed rapidly. One interleaving example is shown in FIG. 17. The data pattern on one LCD spatial light modulator 90a or 90b is shown at 32; the pattern at the other LCD spatial light modulator 90a or 90b is shown at 33. Shaded regions for stripes 30 denote active pixel regions; dashed lines denote potential regions that were not exposed because the value for that column location is 0 and not 1. It should be noted that the two LCD spatial light modulators 90a and 90b need not be accurately aligned to each other in the vertical direction. Horizontal alignment, however, is more critical, but need not be better than within a few pixels. If the columns indicated for decoding spatially sparse watermark 34 are not evenly spaced, software compensation can be provided, following calibration of film writer 100.

Figure 19:
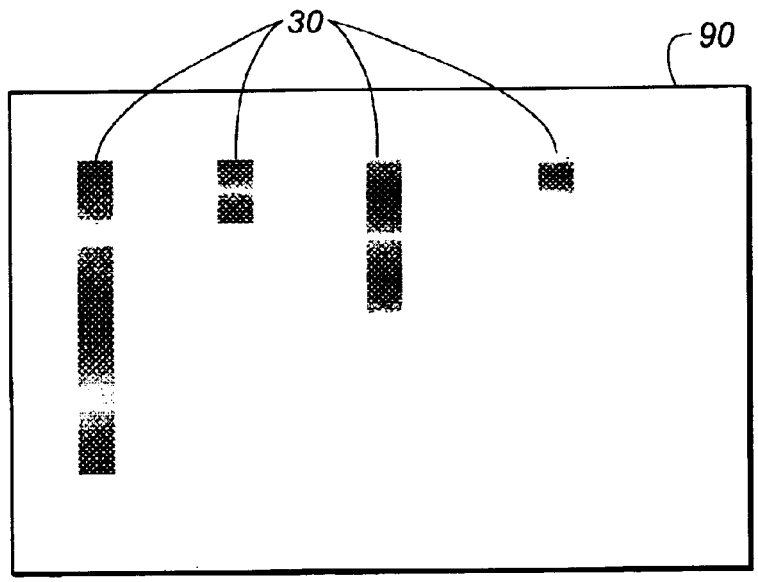
FIG. 19 shows image patterns on the LCD that have various lengths and sinusoidal modulation frequencies in order to reduce perceptibility.

It is possible, especially with fast switching spatial light modulators such as DMDs, to allow simultaneous exposure with two modulators, rather than to use a cyclically alternating ping pong approach. The patterns used can be changed rapidly on both modulators to more closely simulate film grain. Another technique to make stripes 30, 31 less visible is to modulate them along their length, as shown in FIG. 19. Instead of creating an area on the LCD of uniform effective reflectivity, the reflectivity can be varied, for example, sinusoidally, along spot 132 or 134 (FIG. 12). Such an approach would be useful if the amount of smearing is low.

In order to make long stripes less perceptible, it is possible to modulate the data intensity along the stripe instead of having a fixed level. FIG. 19 shows how stripes might be modulated sinusoidally along their length by applying the appropriate image data to spot 132 or 134 on LCD spatial light modulator 90 (FIG. 12). Four stripes 30 of different lengths and different modulation frequencies are shown as possibilities. Other modulation types (square wave, triangle wave, random noise) are also possible. If lengthwise modulation of the stripes is accomplished by varying the code value to LCD spatial light modulator 90, then this approach limits the amount of useful smear for increasing exposure time. When forming stripe 30, data modulation is best used where adequate exposure is available. An alternative approach is to form spots 132 and 134 on LCD spatial light modulator 90 at a fixed code value and to modulate LED light source 60. However, this alternate approach has limitations due to smearing.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, many of the techniques described in this application for use with LCD modulators can also be adapted for DMD and other spatial light modulator devices. LCD modulators of the reflective type are shown; however, transmissive type devices could also be used as spatial light modulators with corresponding changes to imaging path optics, well known in the imaging art. While LED light sources provide particular advantages, other types of light sources could also be used, including lasers and lamps provided with high speed shutters, such as LCD shutters, for example.

Thus, what is provided is an apparatus and method for forming a watermark onto a photosensitive film that is manufactured at high speeds.

PARTS LIST 20 film
21 film perforation
22 tile
23 area watermark
28 image frame
30 stripe
31 stripe
32 data pattern from $1^{st}$ LCD
33 data pattern from $2^{nd}$ LCD
34 spatially sparse watermark
36 lens
38 collimating lens
40 density versus log exposure curve
41 swath
45 uniformizer
46 exposure station
47 encoder
48 roller
49 roller
50 CPU controller
51 motor drive
52 polarizer (optional)
55 columns
60 light source
60a light source
60b light source
62 polarization beam combiner
70 condenser lens
72 heater
80a edges of swath
80b edges of swath
81 polarization beamsplitter
90 LCD spatial light modulator (SLM)

90a LCD spatial light modulator (SLM)
90b LCD spatial light modulator (SLM)
93 digital micromirror device (DMD) spatial light modulator
100 spatially modulated light source (film writer)
110 print lens
120 pulse
130 1×1 spot
132 1×2 spot
134 1×10 spot
140 film plane
180 EO curve
182 swath
184 patch segment
190 timing waveform
192 timing waveform
200 exposure cycle
202 load cycle

What is claimed is:

1. An apparatus for exposing a latent watermark along a length of photosensitive medium, the apparatus comprising:
   (a) an illumination source for providing an exposure illumination;
   (b) a first spatial light modulator for modulating said exposure illumination to form a first exposure pattern according to first image data;
   (c) a second spatial light modulator for modulating said exposure illumination to form a second exposure pattern according to second image data;
   (d) combining optics providing a single output path for directing said first and second exposure patterns onto the photosensitive medium;
   (e) a transport for providing continuous lengthwise displacement of the photosensitive medium, during exposure, with respect to said single output path;
   wherein said first and second spatial light modulators cyclically alternate in providing respective first and second exposure patterns to said combining optics, such that during a cycle wherein said first spatial light modulator forms said first exposure pattern, said second spatial light modulator loads the image data for providing said second exposure pattern; and
   said first and second exposure patterns thereby forming, lengthwise along the photosensitive medium, said latent watermark comprising modulated stripes having a predetermined intensity corresponding to said first and second exposure patterns.

2. An apparatus for exposing a latent watermark according to claim 1 wherein said illumination source is selected from a group comprising a lamp, an LED, and a laser.

3. An apparatus for exposing a latent watermark according to claim 1 wherein said illumination source comprises:
   (a) a first light source for providing illumination to said first spatial light modulator; and
   (b) a second light source for providing illumination to said second spatial light modulator.

4. An apparatus for exposing a latent watermark according to claim 1 wherein said illumination source comprises:
   (a) a first LED for providing illumination to said first spatial light modulator; and
   (b) a second LED for providing illumination to said second spatial light modulator.

5. An apparatus for exposing a latent watermark according to claim 1 wherein said first spatial light modulator is selected from a group comprising a reflective LCD, a transmissive LCD, and a DMD.

6. An apparatus for exposing a latent watermark according to claim 1 wherein said combining optics comprises a polarization combiner.

7. An apparatus for exposing a latent watermark according to claim 1 wherein said combining optics comprises a polarization beamsplitter.

8. An apparatus for exposing a latent watermark according to claim 1 wherein said photosensitive medium is a motion picture print film.

9. An apparatus for exposing a latent watermark according to claim 1 wherein said first exposure pattern is modulate during said cycle.

10. An apparatus for exposing a latent watermark according to claim 1 further comprising a heater for heating said spatial light modulator.

11. An apparatus for exposing a latent watermark according to claim 1 wherein said first exposure pattern is formed only on a fractional segment of the image forming surface of said first spatial light modulator.

12. An apparatus for exposing a latent watermark according to claim 11 wherein said first spatial light modulator is disposed with said fractional segment centered on the optical output path.

13. An apparatus for exposing a latent watermark according to claim 1 wherein said exposure illumination is monochrome.

14. An apparatus for exposing a latent watermark according to claim 12 wherein said exposure illumination is blue.

15. An apparatus for exposing a latent watermark according to claim 1 wherein said illumination source comprises an LED and a drive circuit that provides pulses exceeding the continuous current rating of said LED.

16. An apparatus for exposing a latent watermark according to claim 1 wherein said first exposure pattern and said second exposure pattern are spatially interleaved.

17. An apparatus for exposing a latent watermark according to claim 1 wherein said first exposure pattern is arranged on a surface of said first spatial light modulator as a rectangular set of pixels with a length direction of said rectangular set of pixels corresponding to a direction of displacement of the photosensitive medium.

18. An apparatus as in claim 1 wherein said photosensitive medium is exposed to said latent watermark before or after said photosensitive medium is exposed to form an image frame.

19. An apparatus for exposing a latent watermark as a series of lengthwise stripes along a length of photosensitive medium comprising:
   (a) an illumination source comprising an LED for providing an exposure illumination and a drive circuit for providing pulses to the LED in excess of the continuous current rating of the LED;
   (b) a first spatial light modulator for modulating said exposure illumination to form a first exposure pattern according to image data;
   (c) a second spatial light modulator for modulating said exposure illumination to form a second exposure pattern according image data;
   (d) combining optics providing a single output path for directing said first and second exposure patterns onto the photosensitive medium;
   (e) transport means for providing, during exposure, continuous lengthwise displacement of the photosensitive medium with respect to said single output path;
   wherein said first and second spatial light modulators cyclically alternate in providing respective said first and second exposure patterns to said combining optics, such that during a cycle wherein said first spatial light modulator forms said first exposure pattern, said second spatial light modulator loads the image data for providing said second exposure pattern; and said first and second exposure patterns thereby forming the latent watermark, wherein each of the lengthwise stripes has a predetermined intensity corresponding to said first and second exposure patterns.

20. An apparatus for exposing a latent watermark as a series of lengthwise stripes along a length of photosensitive medium, the apparatus comprising:
(a) an illumination source for providing an exposure illumination;
(b) a spatial light modulator for modulating said exposure illumination to form an exposure pattern according to image data;
(c) a lens for directing said exposure pattern toward the photosensitive medium;
(d) transport means for providing, during exposure, continuous lengthwise displacement of the photosensitive medium with respect to said lens; and
said exposure pattern thereby forming the latent watermark, wherein each of the lengthwise stripes has a predetermined intensity corresponding to said exposure pattern.

21. An apparatus for exposing a latent watermark according to claim 20 wherein said spatial light modulator is a DMD.

22. An apparatus for exposing a latent watermark according to claim 20 wherein said illumination source is taken from the group comprising a lamp, an LED, and a laser.

23. An apparatus for exposing a latent watermark according to claim 20 wherein said exposure illumination is monochrome.

24. An apparatus for exposing a latent watermark according to claim 23 wherein said exposure illumination is blue.

25. An apparatus for exposing a latent watermark according to claim 20 wherein said illumination source comprises LED and a drive circuit that provides pulses exceeding the continuous current rating of said LED.

26. An apparatus for exposing a latent watermark according to claim 20 wherein said photosensitive medium is a motion picture print film.

27. A method for exposing a latent watermark along a length of photosensitive medium, the method comprising:
(a) energizing an illumination source for providing an exposure illumination;
(b) forming a first exposure pattern according to image data by modulating said exposure illumination at a first spatial light modulator;
(c) forming a second exposure pattern according to image data by modulating said exposure illumination at a second spatial light modulator;
(d) directing said first and second exposure patterns onto the photosensitive medium over a single output path;
(e) providing, during exposure, a continuous lengthwise displacement of the photosensitive medium with respect to said single output path, exposing a set of lengthwise stripes thereby; and
wherein said first and second spatial light modulators cyclically alternate in forming respective first and second exposure patterns, such that during a cycle wherein said first spatial light modulator forms said first exposure pattern, said second spatial light modulator loads the image data for forming said second exposure pattern.

28. A method for exposing a latent watermark according to claim 27 wherein the step of energizing an illumination source comprises the step of energizing an LED.

29. A method for exposing a latent watermark according to claim 27 wherein the step of energizing an illumination source comprises the step of energizing a laser.

30. A method for exposing a latent watermark according to claim 27 wherein the step of energizing an illumination source comprises the step of energizing a lamp.

31. A method for exposing a latent watermark according to claim 27 wherein the step of directing said first and second exposure patterns onto the photosensitive medium over a single output path comprises the step of directing light through a polarization combiner.

32. A method for exposing a latent watermark according to claim 27 wherein the step of directing said first and second exposure patterns onto the photosensitive medium over a single output path comprises the step of directing light through a polarization beamsplitter.

33. A method for exposing a latent watermark according to claim 27 wherein said first spatial light modulator is an LCD.

34. A method for exposing a latent watermark according to claim 27 wherein the step of forming a first exposure pattern comprises the step of forming a pattern over only a portion of the imaging surface of said first spatial light modulator.

35. A method for exposing a latent watermark according to claim 34 wherein the step of directing said first and second exposure patterns onto the photosensitive medium over a single output path comprises the step of optically centering said portion of said first spatial light modulator in said single output path.

36. A method for exposing a latent watermark according to claim 27 wherein the step of energizing an illumination source comprises the step of momentarily driving an LED with current in excess of its continuous rated current.

37. A method for exposing a latent watermark according to claim 27 wherein the step of forming said first exposure pattern at said first spatial light modulator comprises the step of modulating a rectangular set of pixels having a length dimension in the direction of said lengthwise displacement of the photosensitive medium.

38. A method for exposing a latent watermark according to claim 27 wherein said first and second exposure pattern are shifted to provide interleaving.

39. A method for exposing a latent watermark along a length of photosensitive medium, the method comprising:
(a) energizing an illumination source for providing an exposure illumination;
(b) forming an exposure pattern according to image data by modulating said exposure illumination at a spatial light modulator;
(c) directing said exposure pattern onto the photosensitive medium over an output path; and
(d) providing, during exposure, a continuous lengthwise displacement of the photosensitive medium with respect to said output path, exposing a set of lengthwise stripes thereby.

40. A method for exposing a latent watermark according to claim 39 wherein the step of modulating said exposure illumination at a spatial light modulator comprises the step of modulating a DMD.

41. A method for encoding a watermark on a photosensitive motion picture medium comprising:
a) transporting the un-imaged motion picture medium continuously past a spatial light modulator;

b) forming at least one spot by modulating a plurality of adjacent pixels on the spatial light modulator; and c) modulating light at the at least one spot to expose a corresponding stripe on the motion picture medium.

42. A method for exposing and detecting a latent watermark along a length of photosensitive medium, the method comprising:

(a) energizing an illumination source for providing an exposure illumination;

(b) forming a first exposure pattern according to image data by modulating said exposure illumination at a first spatial light modulator;

(c) forming a second exposure pattern according to image data by modulating said exposure illumination at a second spatial light modulator;

(d) directing said first and second exposure patterns onto the photosensitive medium over a single output path;

(e) providing, during exposure, a continuous lengthwise displacement of the photosensitive medium with respect to said single output path, exposing a set of lengthwise stripes to produce said latent watermark;

wherein said first and second spatial light modulators cyclically alternate in forming respective first and second exposure patterns, such that during a cycle wherein said first spatial light modulator forms said first exposure pattern, said second spatial light modulator loads the image data for forming said second exposure pattern;

(f) developing said photosensitive medium to produce a detectable watermark; and (g) detecting said watermark.

* * * * *